US008189884B2

(12) United States Patent
Can et al.

(10) Patent No.: US 8,189,884 B2
(45) Date of Patent: May 29, 2012

(54) METHODS FOR ASSESSING MOLECULAR EXPRESSION OF SUBCELLULAR MOLECULES

(75) Inventors: Ali Can, Troy, NY (US); Michael John Gerdes, Albany, NY (US); Musodiq Olatayo Bello, Niskayuna, NY (US); Xiaodong Tao, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1099 days.

(21) Appl. No.: 12/056,068

(22) Filed: Mar. 26, 2008

(65) Prior Publication Data
US 2009/0245598 A1 Oct. 1, 2009

(51) Int. Cl.
G06K 9/00 (2006.01)
G06F 19/10 (2011.01)
(52) U.S. Cl. ........... 382/128; 382/133; 702/19; 600/407
(58) Field of Classification Search .......... 382/128–133; 600/407–464
See application file for complete search history.

(56) References Cited

U.S. PATENT DOCUMENTS

| 7,219,016 | B2 * | 5/2007 | Rimm et al. ........... 702/19 |
| 2002/0177149 | A1 | 11/2002 | Rimm et al. | |
| 2003/0036855 | A1 | 2/2003 | Harris et al. | |
| 2007/0016373 | A1 * | 1/2007 | Hunter et al. ........... 702/19 |
| 2008/0031521 | A1 | 2/2008 | Can et al. | |
| 2008/0032321 | A1 | 2/2008 | Ginty et al. | |
| 2008/0032328 | A1 | 2/2008 | Cline et al. | |
| 2008/0033657 | A1 | 2/2008 | Cline et al. | |
| 2009/0034823 | A1 * | 2/2009 | Christiansen et al. ........ 382/133 |
| 2009/0202130 | A1 * | 8/2009 | George et al. ................ 382/133 |

OTHER PUBLICATIONS

Gloria J. F. Ding, Paul A. Fischer, Robert C. Boltz, Jack A. Schmidt, James J. Colaianne, Albert Gough, Richard A. Rubin, and Douglas K. Miller, "Characterization and Quantitation of NF-kB Nuclear Translocation Induced by Interleukin-1 and Tumor Necrosis Factor-x", The Journal of Biological Chemistry, vol. 273, No. 44, pp. 28897-28905, Oct. 30, 1998.

Andrzej Deptala, Elzbieta Bedner, Wojciech Gorczyca, and Zbigniew Darzynkiewicz; "Activation of Nuclear Factor Kappa B (NF-kB) Assayed by Laser Scanning Cytometry (LSC)", Wiley-Liss, Inc., vol. 33, pp. 376-382, 1998.

* cited by examiner

*Primary Examiner* — Melissa Koval
*Assistant Examiner* — Emily Chan
(74) *Attorney, Agent, or Firm* — Fletcher Yoder, P.C.

(57) ABSTRACT

The present techniques provide fully automated methods for quantifying the location, strength and percent of expressed target molecules or other biological markers in immunohistochemically stained biological samples. The samples may be automatically segmented, for example into subcellular compartments, from images of compartmental markers. Then, the distribution of a target molecule on each of these compartments is calculated that includes the percentage and strength of expression. This is different than existing intensity or ratio based methods where abundant low expression levels are indistinguishable from scarce high expression levels.

24 Claims, 23 Drawing Sheets

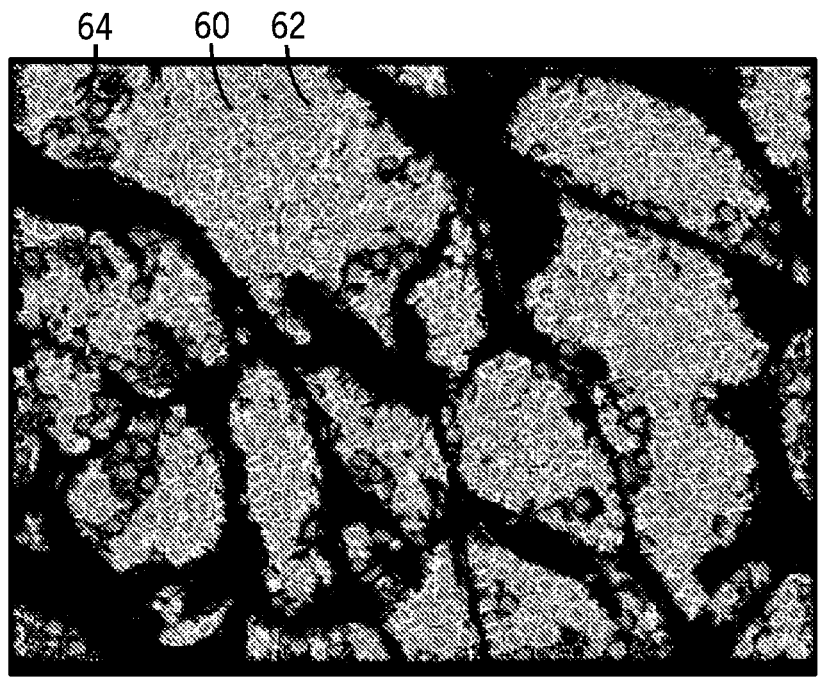
FIG. 4A
FIG. 4B
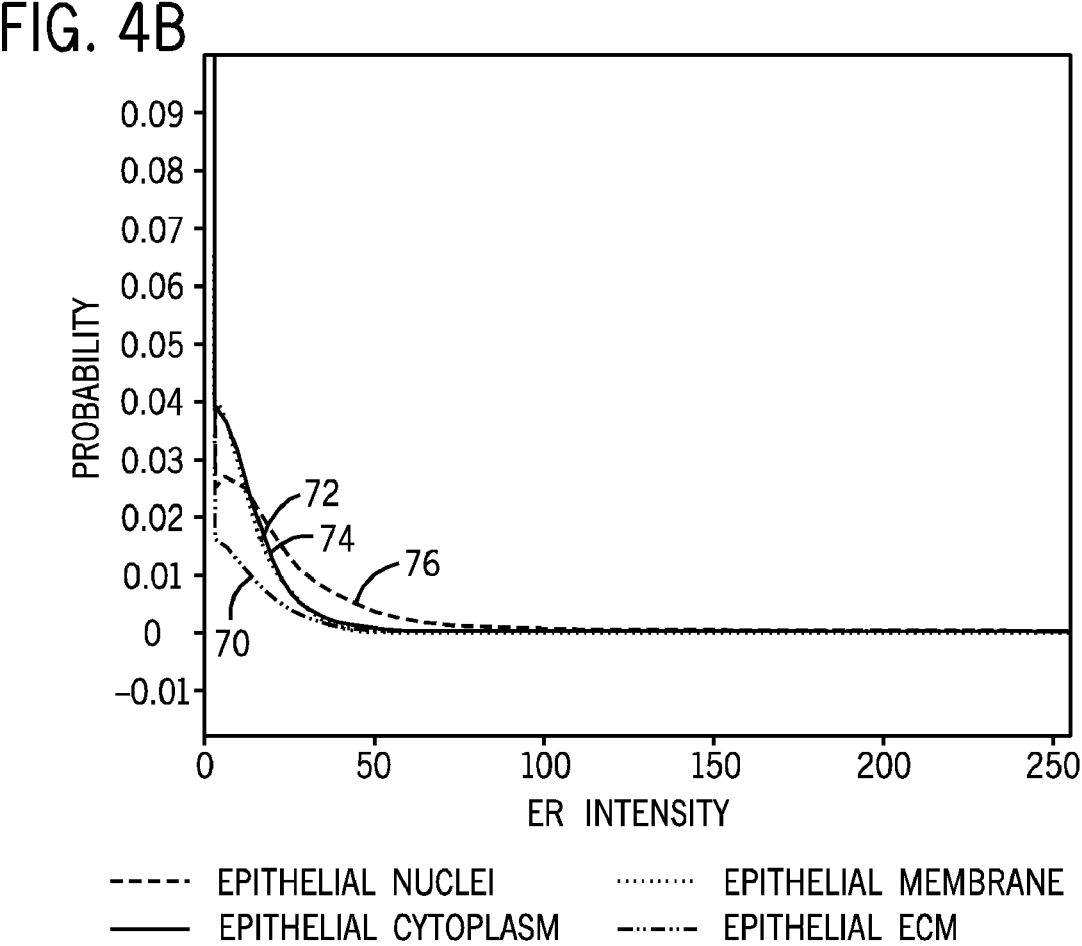
- - - - EPITHELIAL NUCLEI          ·········· EPITHELIAL MEMBRANE
——— EPITHELIAL CYTOPLASM   –··– EPITHELIAL ECM

METHODS FOR ASSESSING MOLECULAR EXPRESSION OF SUBCELLULAR MOLECULES

BACKGROUND

The invention relates generally to image processing and image analysis. More specifically, the present technique relates to image analysis for quantifying expression levels and distribution of proteins or other biological markers within a biological sample.

Quantifying expression levels of proteins with subcellular resolution is useful in many applications ranging from biomarker discovery, pharmaceutical research, and systems biology to treatment planning. Quantitation of target molecules at subcellular resolution enables direct association of the expression levels with the localized protein pathways. Large-scale prediction and correlation studies can be designed based on automatically quantifying expression patterns with known clinical outcomes The number of markers that are related to the prognosis, drug response, survival time, and disease recurrence has been increasing steadily, and there is a shifting trend towards personalized therapeutics in the design of new drugs and specific qualifying criteria for drug use. Tissue micro arrays have rapidly become an essential tool to increase throughput for validation, and provide proteomic discovery platforms by surveying the expression profile of tumor samples.

Generally, tissue micro arrays may involve large-scale numbers of samples from either a single patient source or a number of patient sources. These samples may be stained with imaging probes that have binding specificity for certain markers, i.e., proteins, of interest. After staining, images of the samples may be acquired and the expression of the marker, or markers, of interest in each sample may be evaluated based on the binding of the probe to the marker.

Current techniques for estimating protein expression in immunohistochemically stained samples involve intensity or ratio-based techniques. These techniques generally provide a single score after evaluation of the image. However, such techniques do not differentiate between abundant low expression levels and scarce high expression levels of the markers of interest. For example, often images are evaluated to determine the percent of cells that have any expression, regardless of intensity, of the marker of interest. If this number is greater than a certain threshold, the image is scored as a positive. Because the intensity is not evaluated, strongly stained images are scored similarly to weakly stained images if the percent of expressing cells is the same. In other techniques, the total immunofluorescence of the image in the range of the probe's fluorescence is used to determine a score for the expression of the marker of interest. However, total immunofluorescence is determined by both the strength of expression as well as the abundance of the marker. A single score does not provide information about these two contributing factors. Therefore, such techniques fail to determine whether a marker exhibits abundant low expression levels or scarce high expression levels.

BRIEF DESCRIPTION

The present techniques provide automated methods to quantify the percent and strength of subcellular protein expression in immunofluorescently stained tissue microarrays and other biological samples. Images of samples that have been immunohistochemically stained are first segmented to localize subregions of the image with an automated segmentation algorithm that computes the compartments using both intensity and geometric cues. For example, segmenting may localize membrane, nuclei, and cytoplasmic regions. Additionally, epithelial regions may be separated from the stromal regions by staining the images with a probe for a specific marker, such as keratin. Then the distributions of the target molecules in each of the compartments may be calculated. The measured distributions are the sum of a target molecule expression, and the autofluorescence and non-specific background binding. The target distribution can be deconvolved from the observed mixed distribution. Then, the percent and strength of expressions may be calculated as separate entities. Such techniques provide advantages for scoring markers associated with disease. For example, the present techniques may be used to evaluate markers associated with cancer such as estrogen receptor, androgen receptor, progesterone receptor, TP53 and/or Her2. The present techniques provide image scoring based on both the strength and the percentage of expression of the marker of interest.

The present techniques may provide information about the compartmental region or regions (e.g., nuclei or cytoplasm) in which a target molecule is expressed. Further, these techniques provide information about the percentage of the compartments expressing a target molecule in a sample or in a region of interest (ROI) such as epithelial tissue regions or stromal tissue regions. Additionally, the strength of expression of target molecules within these ROI can be quantified as well. The present techniques may also be used to evaluate images of biological material to make a clinical determination about the images. For example, the images may be scored as positive or negative for cancer. The present techniques provide a method for evaluating image data that includes providing a first image of a biological sample, wherein the image is segmented into a first type of compartment and at least a second type of compartment; providing a second image of the biological sample, wherein the biological sample comprises a signal generator with binding specificity to a target molecule; determining a percentage of the first type of compartment, the second type of compartment, or a combination thereof, in which the target molecule is expressed; and determining an intensity distribution of the target molecule in the first type of compartment, the second type of compartment, or a combination thereof.

Further, the present techniques provide a computer-readable medium that includes instructions for receiving a first image of a biological sample, wherein the image is segmented into a first type of compartment and at least a second type of compartment; receiving a second image of the biological sample, wherein the biological sample comprises a signal generator with binding specificity to a target molecule; determining a percentage of the first type of compartment, the second type of compartment, or a combination thereof, in which the target molecule is expressed; and determining an intensity distribution of the target molecule in the first type of compartment, the second type of compartment, or a combination thereof.

In addition, the present techniques provide an image analysis system that includes a processor adapted to a processor adapted to receive a first image of a biological sample, wherein the image is segmented into a first type of compartment and at least a second type of compartment and a second image of the biological sample, wherein the biological sample comprises a signal generator with binding specificity to a target molecule. The processor is adapted to run instructions for: determining a percentage of the first type of compartment, the second type of compartment, or a combination thereof, in which the target molecule is expressed; and determining an intensity distribution of the target molecule in the first type of compartment, the second type of compartment, or a combination thereof.

DRAWINGS

These and other features, aspects, and advantages of the present invention will become better understood when the following detailed description is read with reference to the accompanying drawings in which like characters represent like parts throughout the drawings, wherein:

FIG. 4A is a fluorescent image of a breast cancer tissue sample with the epithelial regions segmented into nuclear, cytoplasmic and membrane compartments;

FIG. 4B is a graph of the probability distribution function for the nuclear, membrane, and cytoplasmic compartments for the image in FIG. 3A;

Figure 8A:
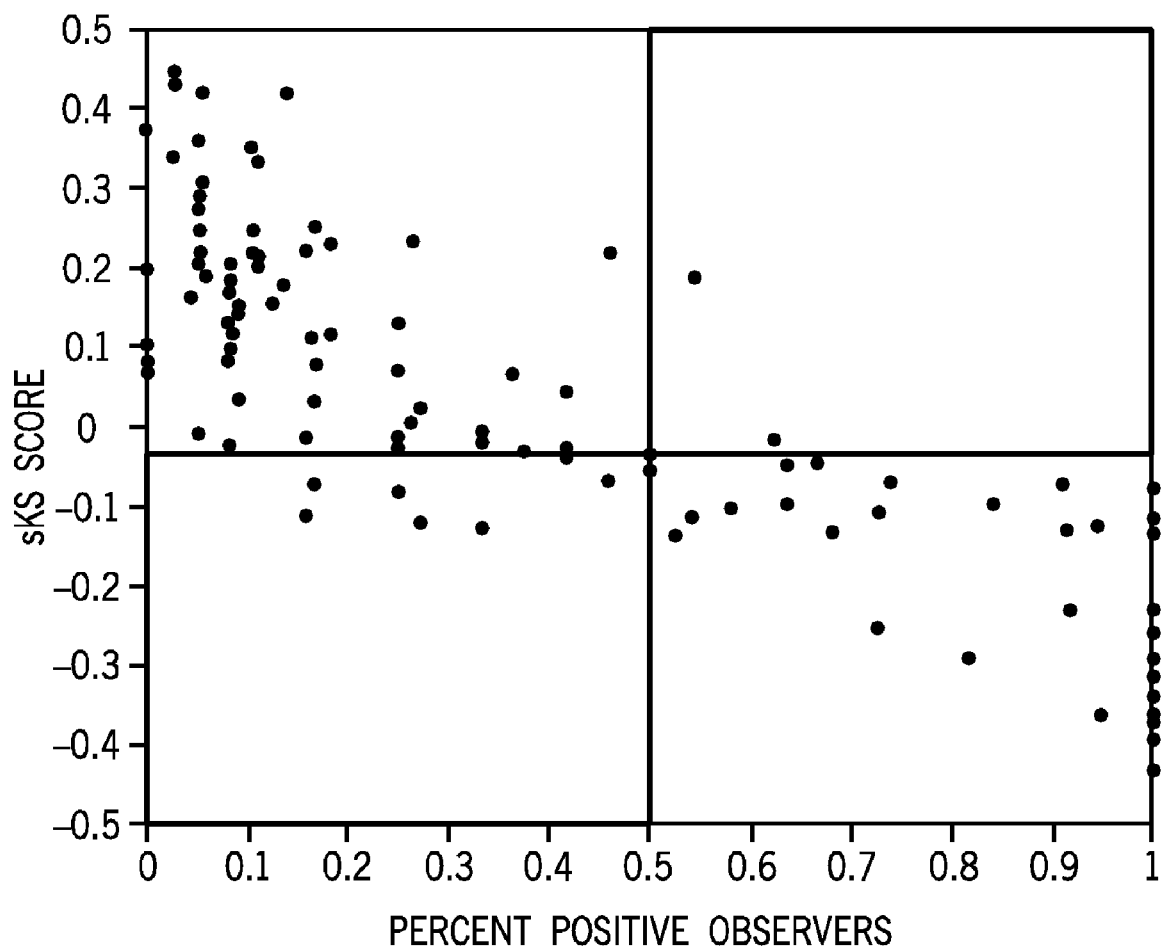
FIG. 8A is a graph of a comparison of the signed Kolomogorov-Smirnov Distance score with the percent of observers reported positive for 55 human tissue samples stained with a probe specific for estrogen receptor and scored according to the present techniques as well as by human observers.
Figure 8B:
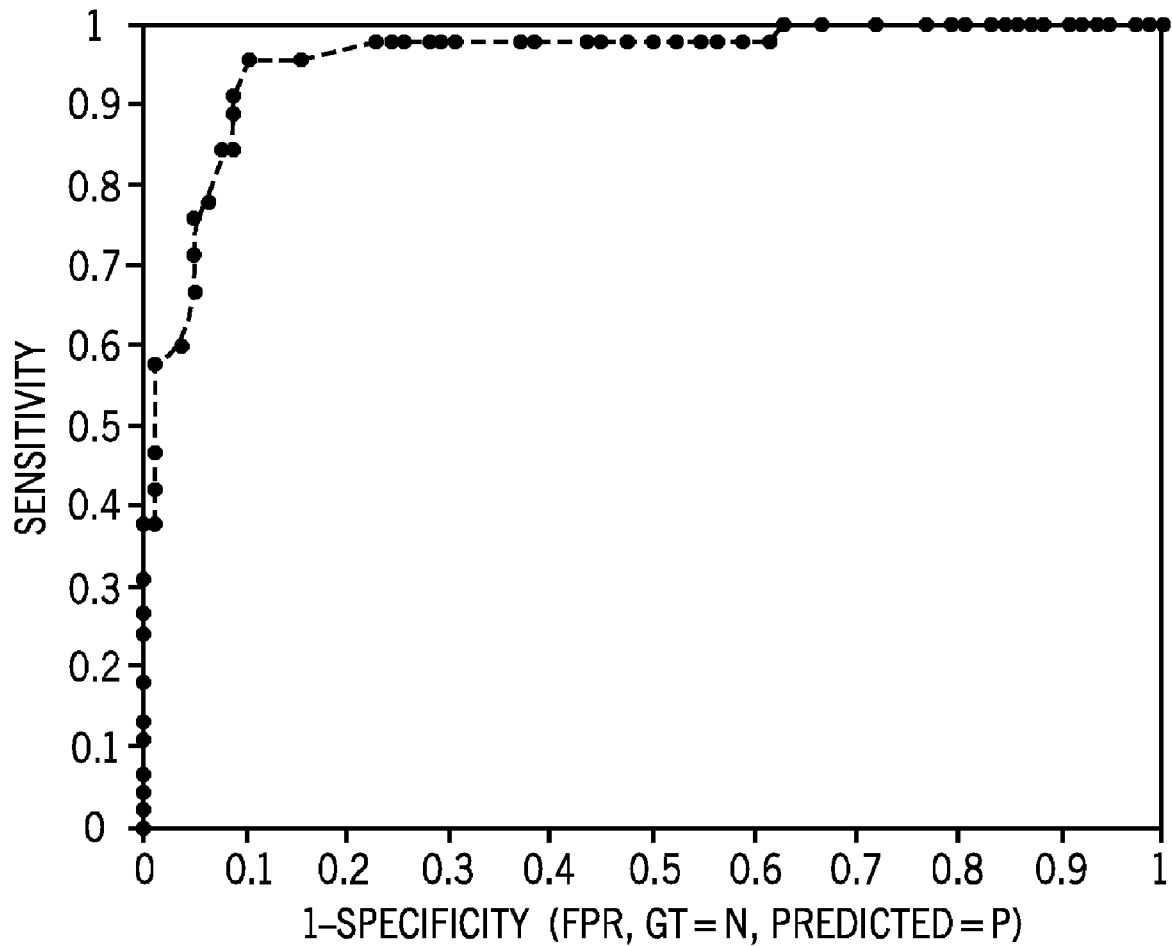
FIG. 8B is a graph of a receiver operating characteristic (ROC) curve of the signed Kolomogorov-Smirnov Distance score when the majority of human observers score is considered as the ground truth for the tissue samples.
Figure 8C:
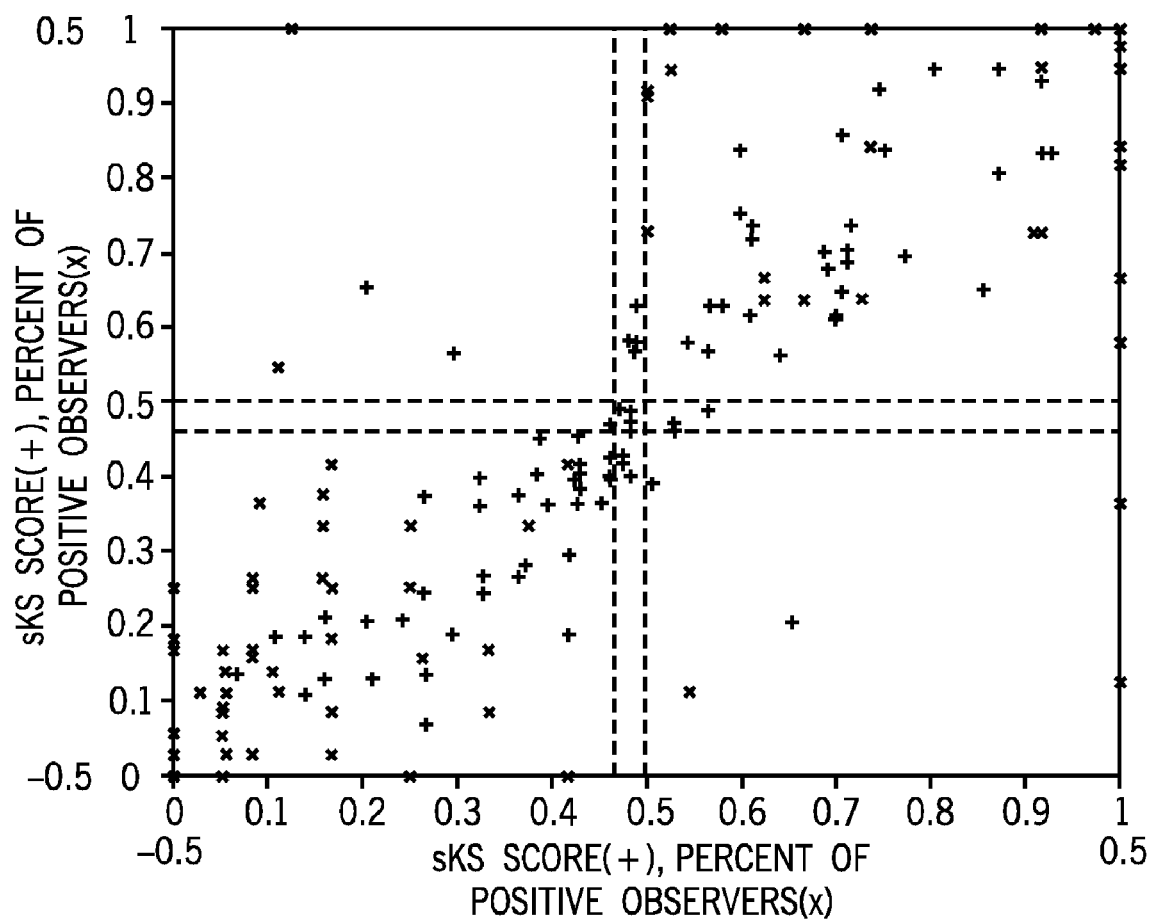
Figure 8D:
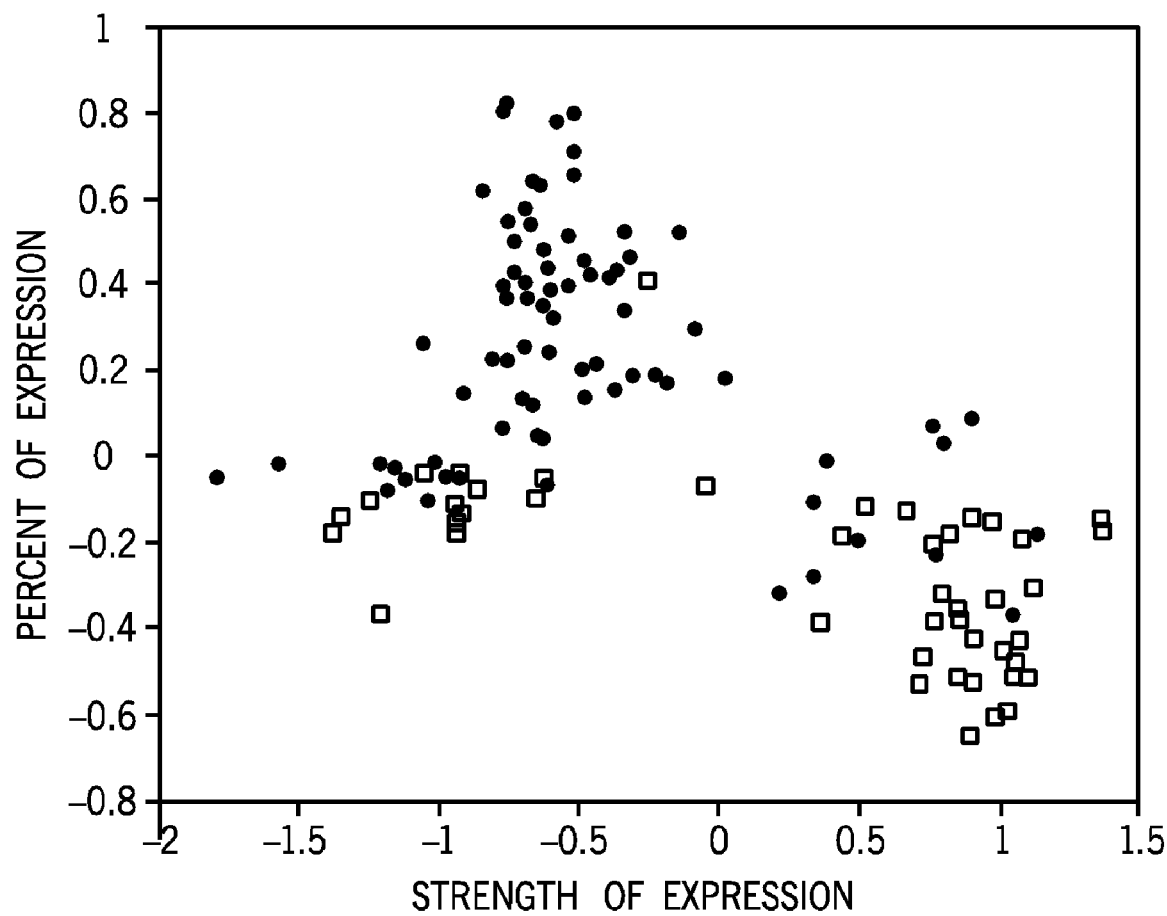

FIG. 8C a comparison of the signed Kolomogorov-Smirnov Distance score with the percent of observers reported positive across pairs of tissue samples from the same patient; and FIG. 8D is a graph of the percent expression and strength of expression for estrogen receptor positive and negative tissues identified by a majority of human observers for the tissue samples.

DETAILED DESCRIPTION

The present techniques provide fully automated methods for quantifying the location, strength and percent of expressed target molecules in immunohistochemically stained tissue micro arrays. At least two compartments, for example subcellular compartments, may be segmented from images of compartmental markers. The segmentation may occur by any suitable method, including automatic methods and methods involving user intervention. Then, the distribution of one or more target molecules (e.g., proteins) in each of these compartments is calculated. The estimated distribution comprises target distribution from the expressed regions as well as nonspecific background binding and tissue autofluorescence. The present techniques provide mathematical models and methods to unmix the observed distribution and explicitly calculate the percentage and strength of expression. These methods provide advantages over existing intensity or ratio based methods where abundant low expression levels are indistinguishable from scarce high expression levels.

The present techniques are automated and designed to eliminate observer bias from the scoring of immunohistochemically stained biological samples. Using the intrinsic compartments as a normalization channel, the present techniques simplify the quality control process. In addition to clinical use, the present techniques may be used as a quality control tool to evaluate specimen preparation conditions as well.

In one embodiment, the present techniques may be used to determine the expression level and percentage of proteins or other biomarkers associated with a disease condition such as cancer. For example, the expression level and percentage of estrogen receptor (ER) expression in nuclei may be evaluated to determine estrogen receptor protein status in breast cancer patients. Determining the estrogen receptor expression level may be useful for predicting the response of patients to drugs (Tamoxifen or other anti-estrogens), to predict survival time (ER+ is favorable), and to differentiate endocervical (ER−) from endometrial (ER+) adenocarcinomas. Accordingly, in certain embodiments, the present techniques may be useful for making clinical determinations related to patient treatment and/or disease diagnosis.

The present techniques offer advantages over visual scoring of biomarkers based on the percentage of tumor cells with positive expression because such techniques fail to provide more detailed information about the distribution and intensity of proteins. For example, Human Epidermal Growth Factor Receptor 2 (Her2) is a commonly studied biomarker associated with certain cancers. In previous techniques, membrane staining in less than 10% of tumor cells results in the tissue being scored as 0 (negative). A faint membrane staining in more than 10% of tumor cells; or a weak staining less than 10% of the tumor cells is scored as 1+ (negative). A weak/moderate complete membrane staining in more 10% of tumor cells is scored as 2+ (weak positive). Strong complete membrane staining in more than 10% of tumor cells is scored as 3+. In contrast, a score of 2+ is not predictive and has significant inter-observer variability. The lack of reproducible Her2 scoring is associated more with subjective scoring methods than with tumor heterogeneity or differences in sample fixation or processing.

Similarly, tumor protein 53 (TP53) is a protein that ensures that cells repair any damaged DNA before cell division by inducing cell cycle arrest. As a consequence, either the DNA is repaired or the cell is forced to undergo apoptosis. In clinics, TP53 staining of more than 5% of nuclei is usually considered positive. Because the percent staining threshold for visual scoring is very low, the possibility for subjective errors, e.g., false positives, is increased. In the present techniques, the automated scoring methods may provide advantages for the analysis of images stained for TP53.

Figure 1:
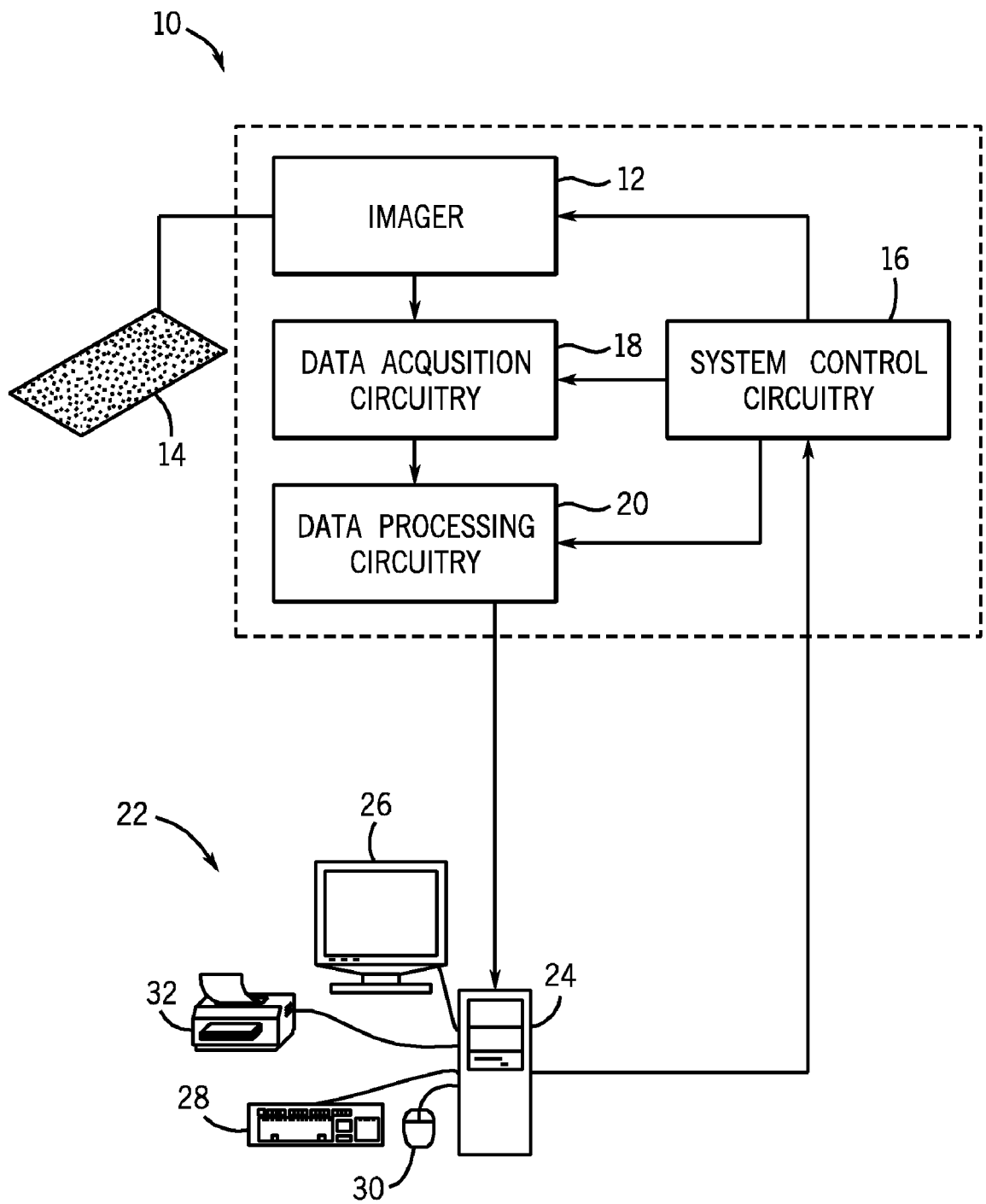
FIG. 1 is a diagrammatical view of an exemplary system for use in acquiring image data of cells in accordance with aspects of the present technique.

The present techniques provide systems and methods for image analysis. In certain embodiments, it is envisioned that the present techniques may be used in conjunction with previously acquired images, for example, digitally stored images, in retrospective studies. In other embodiments, the images may be acquired from a physical sample. In such embodiments, the present techniques may be used in conjunction with an image acquisition system. An exemplary imaging system 10 capable of operating in accordance with the present technique is depicted in FIG. 1. Generally, the imaging system 10 includes an imager 12 that detects signals and converts the signals to data that may be processed by downstream processors. The imager 12 may operate in accordance with various physical principles for creating the image data and may include a fluorescent microscope, a bright field microscope, or devices adapted for suitable imaging modalities. In general, however, the imager 12 creates image data indicative of a biological sample including a population of cells 14, shown here as being multiple samples on a tissue micro array, either in a conventional medium, such as photographic film, or in a digital medium. As used herein, the term "biological material" or "biological sample" refers to material obtained from, or located in, a biological subject, including biological tissue or fluid obtained from a subject. Such samples can be, but are not limited to, body fluid (e.g., blood, blood plasma, serum, or urine), organs, tissues, fractions, and cells isolated from, or located in, any biological system, such as mammals. Biological samples and/or biological materials also may include sections of the biological sample including tissues (e.g., sectional portions of an organ or tissue). Biological samples may also include extracts from a biological sample, for example, an antigen from a biological fluid (e.g., blood or urine).

The imager 12 operates under the control of system control circuitry 16. The system control circuitry 16 may include a wide range of circuits, such as illumination source control circuits, timing circuits, circuits for coordinating data acquisition in conjunction with sample movements, circuits for controlling the position of light sources and detectors, and so forth. In the present context, the system control circuitry 16 may also include computer-readable memory elements, such as magnetic, electronic, or optical storage media, for storing programs and routines executed by the system control circuitry 16 or by associated components of the system 10. The stored programs or routines may include programs or routines for performing all or part of the present technique.

Image data acquired by the imager 12 may be processed by the imager 12, for a variety of purposes, for example to convert the acquired data or signal to digital values, and provided to data acquisition circuitry 18. The data acquisition circuitry 18 may perform a wide range of processing functions, such as adjustment of digital dynamic ranges, smoothing or sharpening of data, as well as compiling of data streams and files, where desired.

The data acquisition circuitry 18 may also transfer acquisition image data to data processing circuitry 20, where additional processing and analysis may be performed. Thus, the data processing circuitry 20 may perform substantial analyses of image data, including ordering, sharpening, smoothing, feature recognition, and so forth. In addition, the data processing circuitry 20 may receive data for one or more sample sources, (e.g. multiple wells of a multi-well plate). The processed image data may be stored in short or long term storage devices, such as picture archiving communication systems, which may be located within or remote from the imaging system 10 and/or reconstructed and displayed for an operator, such as at the operator workstation 22.

In addition to displaying the reconstructed image, the operator workstation 22 may control the above-described operations and functions of the imaging system 10, typically via an interface with the system control circuitry 16. The operator workstation 22 may include one or more processor-based components, such as general purpose or application specific computers 24. In addition to the processor-based components, the computer 24 may include various memory and/or storage components including magnetic and optical mass storage devices, internal memory, such as RAM chips. The memory and/or storage components may be used for storing programs and routines for performing the techniques described herein that are executed by the operator workstation 22 or by associated components of the system 10. Alternatively, the programs and routines may be stored on a computer accessible storage and/or memory remote from the operator workstation 22 but accessible by network and/or communication interfaces present on the computer 24.

The computer 24 may also comprise various input/output (I/O) interfaces, as well as various network or communication interfaces. The various I/O interfaces may allow communication with user interface devices, such as a display 26, keyboard 28, mouse 30, and printer 32, that may be used for viewing and inputting configuration information and/or for operating the imaging system 10. The various network and communication interfaces may allow connection to both local and wide area intranets and storage networks as well as the Internet. The various I/O and communication interfaces may utilize wires, lines, or suitable wireless interfaces, as appropriate or desired.

More than a single operator workstation 22 may be provided for an imaging system 10. For example, an imaging scanner or station may include an operator workstation 22 which permits regulation of the parameters involved in the image data acquisition procedure, whereas a different operator workstation 22 may be provided for manipulating, enhancing, and viewing results and reconstructed images.

Figure 2:
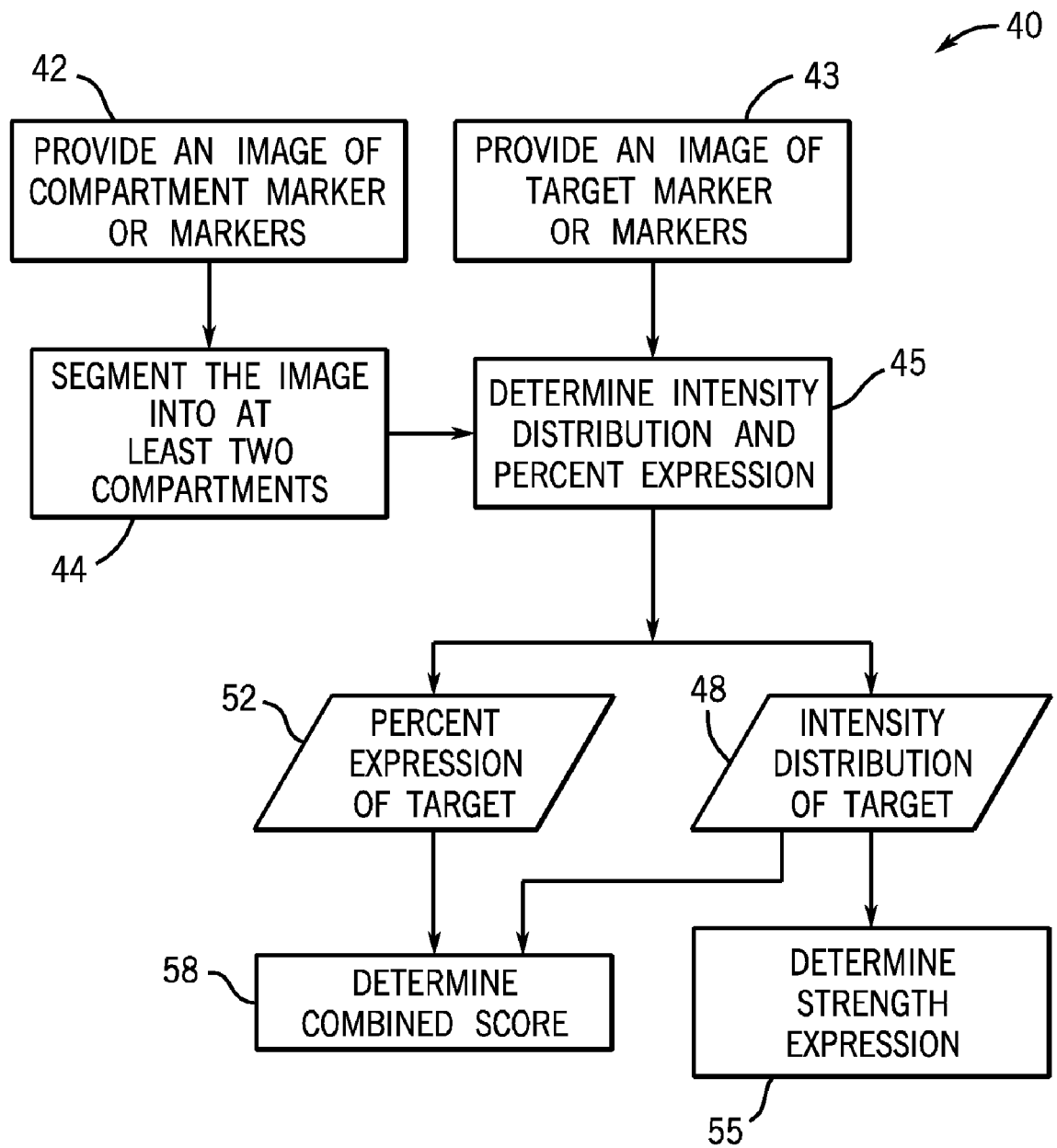
FIG. 2 is a flow chart depicting a process for analyzing cell images in accordance with the present technique.

The computer analysis method 40 used to analyze images is shown in FIG. 2. It should be understood that the method 40 may also be used with stored images that are retrospectively analyzed. Typically, two or more images of the same sample may be obtained or provided. In step 42, the imaging system 10 provides one or more image of one or more compartment markers (see FIGS. 3A-D) of a biological material, for example cells, stained with one or more appropriate staining markers for identifying cellular regions such as the cell membrane, cytoplasm and nuclei. In such an embodiment, a mask of the stromal region may be generated, and using curvature and geometry based segmentation (step 44), the image of the compartment marker or markers is segmented. For example, the membrane and nuclear regions of a given tumor region may be demarcated. The cytoplasm may be designated as the area between the membrane and nucleus or within the membrane space. Any number and type of morphological markers for segmentation may be used in the methods including, but not limited to, the following:

| | |
|---|---|
| Keratin: | marker for epithelial cells |
| Pan-cadherin: | marker for the cell membrane |
| Smooth muscle actin: | marker for muscle |
| DAPI: | marker for the nucleus |
| Hematoxylin | marker for DNA (blue stain) |
| Eosin: | marker for cytoplasm depends on pH (red stain). |

Some of these morphological markers may be imaged using any appropriate imager, such as a bright field microscope or a fluorescent microscope.

In step 44, the image or images may be segmented into compartments or regions. Image segmentation generally involves the partition of an image into a set of overlapping or nonoverlapping regions whose union is a larger image. As used herein, the term "compartments" may refer to the set of structures identified in an image that share morphological features. Accordingly, the "nuclear compartments" may refer to the set of identified nuclei in an image while the "membrane compartments" refer to the set of identified membrane structures. In the segmentation step 44, a general likelihood function estimator may calculate probability maps of two or more compartments. In one embodiment, membrane and nuclei-like structures may be segmented in single channel images of membrane (pan-cadherin) and nuclei (DAPI) markers. The probability maps encode the segmentation information of different shapes in images using probability values between zero and one. The algorithm iteratively estimates empirical likelihood functions of curvature and intensity based features. Geometric constraints may be imposed on the curvature feature to detect nuclei or membrane structures in fluorescent images of tissues.

In one embodiment, the segmentation algorithm may iteratively estimate the empirical likelihood functions of curvature and intensity based features of compartments such as nuclei and membrane compartments. Two curvature based features that are independent of image brightness include:

$$\theta(x, y) = \tan^{-1}\left(\frac{\lambda_1(x, y)}{\lambda_2(x, y)}\right) \quad (A)$$

$$\phi(x, y) = \tan^{-1}\frac{(\lambda_1(x, y)^2 + \lambda_2(x, y)^2)^{1/2}}{I(x, y)}, \quad (B)$$

and may be referred to as shape index (A) and normalized-curvature index (B), respectively. This is essentially the same as defining the eigenvalues in a polar coordinate system. This transformation also results in bounded features, $-3\pi/4 \leq \theta(x,y) \leq \pi/4$, and $0 \leq \phi(x,y) \leq \pi/2$, which are useful in interpreting the results and formulating a unified approach to segment both membrane and nuclei structures. In addition to these curvature features image intensity, I(x,y), may be used as a source of significant information.

An initial segmentation based on the shape index and the normalized-curvature index separates the image pixels into three subsets: background, foreground, and indeterminate. An indeterminate subset includes all the pixels that are not included in the background or foreground subsets. From these subsets the background and foreground intensity distributions and the intensity log-likelihood functions are estimated. The algorithm keeps iterating by using two out of the three features at a time to estimate the distribution of the feature that is left out. In the final step these log-likelihood functions are combined to determine the overall likelihood function. A probability map that represents the probability of a pixel being a foreground is calculated.

The log-likelihood functions are estimated based on the assumption that the intensity and the feature vectors defined in equations A and B are independent. These equations may be normalized such that they measure a ratio rather than absolute values. If the overall image brightness is increased or decreased, these metrics stay unchanged. Starting with initial log-likelihoods determined based on the known geometry of the ridge-like or blob-like structures the algorithm uses two out of these three feature sets to estimate the class membership of each pixel (foreground, background, or indeterminate), and use the pixel classes to estimate the class conditional probability and the log-likelihood of the third feature. This procedure is repeated until either for a certain number of iterations or convergence in log-likelihood functions is achieved. In our experiments we observed that the algorithm converges in three iterations.

Define $f_1(x, y)=I(x, y)$, $f_2(x, y)=\phi(x, y)$, $f_3(x, y)=\theta(x, y)$
Compute initial log-likelihood functions $L(f_2(x, y))$, and $L(f_3(x, y))$
  do
    for k=1:3
      A. Estimate the foreground and background sets $$S^F = \{(x,y): L(f_i(x,y)) \geq \epsilon_i, L(f_j(x,y)) \geq \epsilon_j\}$$

$$S^B = \{(x,y): L(f_i(x,y)) \leq -\epsilon_i, L(f_j(x,y)) \leq -\epsilon_j\}$$

where (i, j)∈{1,2,3}, i≠j≠k
      B. Estimate the decision boundaries $\hat{T}_k$
      C. Estimate the log-likelihood function $$L(f_k(x, y)) = \log\left(\frac{P((x, y) \in S^F / f_k(x, y))}{P((x, y) \in S^B / f_k(x, y))}\right)$$

-continued $$\approx \log\left(\frac{P(f_k(x, y)/(x, y) \in S^F)}{P(f_k(x, y)/(x, y) \in S^B)}\right)$$

Enforce monotonic increasing constraint for the intensity and the normalized-curvature index end for until stopping criteria met Table 1

Exemplary Segmenting Algorithm

In step A, the class memberships are determined based on two of the three features. In step B, the decision boundary along the direction of the feature that is not used in step A is used to estimate the boundary. In step C, the log-likelihood function is estimated as a function of the class conditional functions. For the intensity and normalized-curvature index the monotonicity constraints are then enforced. This implies that, in the case of intensity feature, the brighter a pixel is the more likely it is to be on the foreground.

In addition to providing an image of one or more compartment markers that may be segmented, in step 45, the imager 10 may provide one or more images of one or more target markers specific for a target molecule in the biological material. The biological material may be treated with a target marker including a signal generator that has specific binding for a target molecule. As used herein, the term "target" or "target molecule" refers to the component of a biological sample that may be detected when present in the biological sample. The target may be any substance for which there exists a naturally occurring specific binder (e.g., an antibody), or for which a specific target marker or binder may be prepared (e.g., a small molecule binder or an aptamer). In general, a binder or target marker may bind to a target through one or more discrete chemical moieties of the target or a three-dimensional structural component of the target (e.g., 3D structures resulting from peptide folding). The target may include one or more of natural or modified peptides, proteins (e.g., antibodies, affibodies, or aptamers), nucleic acids (e.g., polynucleotides, DNA, RNA, or aptamers); polysaccharides (e.g., lectins or sugars), lipids, enzymes, enzyme substrates, ligands, receptors, antigens, or haptens. In some embodiments, targets may include proteins or nucleic acids As used herein, the term "specific binding" refers to the specific recognition of one of two different molecules for the other compared to substantially less recognition of other molecules. The molecules may have areas on their surfaces or in cavities giving rise to specific recognition between the two molecules arising from one or more of electrostatic interactions, hydrogen bonding, or hydrophobic interactions. Specific binding examples include, but are not limited to, antibody-antigen interactions, enzyme-substrate interactions, polynucleotide interactions, and the like. In certain embodiments, a "binder" has specific binding for a target molecule. As used herein, the term "binder" refers to a molecule that may bind to one or more targets in the biological sample. A binder may specifically bind to a target. Suitable binders may include one or more of natural or modified peptides, proteins (e.g., antibodies, affibodies, or aptamers), nucleic acids (e.g., polynucleotides, DNA, RNA, or aptamers); polysaccharides (e.g., lectins, sugars), lipids, enzymes, enzyme substrates or inhibitors, ligands, receptors, antigens, or haptens. A suitable binder may be selected depending on the sample to be analyzed and the targets available for detection. For example, a target in the sample may include a ligand and the binder may include a receptor or a target may include a receptor and the binder may include a ligand. Similarly, a target may include an antigen and the binder may include an antibody or antibody fragment or vice versa. In some embodiments, a target may include a nucleic acid and the binder may include a complementary nucleic acid. In some embodiments, both the target and the binder may include proteins capable of binding to each other.

As used herein, the term "signal generator" refers to a molecule capable of providing a detectable signal using one or more detection techniques (e.g., spectrometry, calorimetry, spectroscopy, or visual inspection). Suitable examples of a detectable signal may include an optical signal, and electrical signal, or a radioactive signal. Examples of signal generators include one or more of a chromophore, a fluorophore, a Raman-active tag, or a radioactive label. In one embodiment, a signal generator may include a probe. As used herein, the term "probe" refers to an agent including a binder and a signal generator. In certain embodiments, the probe may be a target marker. In some embodiments, the binder and the signal generator are embodied in a single entity. The binder and the signal generator may be attached directly (e.g., via a fluorescent molecule incorporated into the binder) or indirectly (e.g., through a linker, which may include a cleavage site) and applied to the biological sample in a single step. In alternative embodiments, the binder and the signal generator are embodied in discrete entities (e.g., a primary antibody capable of binding a target and a signal generator-labeled secondary antibody capable of binding the primary antibody). When the binder and the signal generator are separate entities, they may be applied to a biological sample in a single step or multiple steps. As used herein, the term "fluorescent probe" refers to an agent having a binder coupled to a fluorescent signal generator.

As used herein, the term "fluorophore" or "fluorescent signal generator" refers to a chemical compound, which when excited by exposure to a particular wavelength of light, emits light at a different wavelength. Fluorophores may be described in terms of their emission profile, or "color." Green fluorophores (for example Cy3, FITC, and Oregon Green) may be characterized by their emission at wavelengths generally in the range of 515-540 nanometers. Red fluorophores (for example Texas Red, Cy5, and tetramethylrhodamine) may be characterized by their emission at wavelengths generally in the range of 590-690 nanometers. Examples of fluorophores include, but are not limited to, 4-acetamido-4'-isothiocyanatostilbene-2,2'disulfonic acid, acridine, derivatives of acridine and acridine isothiocyanate, 5-(2'-aminoethyl)aminonaphthalene-1-sulfonic acid (EDANS), 4-amino-N-[3-vinylsulfonyl)phenyl]naphthalimide-3,5 disulfonate (Lucifer Yellow VS), N-(4-anilino-1-naphthyl)maleimide, anthranilamide, Brilliant Yellow, coumarin, coumarin derivatives, 7-amino-4-methylcoumarin (AMC, Coumarin 120), 7-amino-trifluoromethylcouluarin (Coumaran 151), cyanosine; 4',6-diaminidino-2-phenylindole (DAPI), 5',5"-dibromopyrogallol-sulfonephthalein (Bromopyrogallol Red), 7-diethylamino-3-(4'-isothiocyanatophenyl)-4-methylcoumarin, -, 4,4'-diisothiocyanatodihydro-stilbene-2,2'-disulfonic acid, 4,4'-diisothiocyanatostilbene-2,2'-disulfonic acid, 5-[dimethylamino]naphthalene-1-sulfonyl chloride (DNS, dansyl chloride), eosin, derivatives of eosin such as eosin isothiocyanate, erythrosine, derivatives of erythrosine such as erythrosine B and erythrosin isothiocyanate; ethidium; fluorescein and derivatives such as 5-carboxyfluorescein (FAM), 5-(4,6-dichlorotriazin-2-yl) aminofluorescein (DTAF), 2'7'-dimethoxy-4'5'-dichloro-6-carboxyfluorescein (JOE), fluorescein, fluorescein isothiocyanate (FITC), QFITC (XRITC); fluorescamine derivative (fluorescent upon reaction with amines); IR144; IR1446; Malachite Green isothiocyanate; 4-methylumbelliferone; ortho cresolphthalein; nitrotyrosine; pararosaniline; Phenol Red, B-phycoerythrin; o-phthaldialdehyde derivative (fluorescent upon reaction with amines); pyrene and derivatives such as pyrene, pyrene butyrate and succinimidyl 1-pyrene butyrate; Reactive Red 4 (Cibacron® Brilliant Red 3B-A), rhodamine and derivatives such as 6-carboxy-X-rhodamine (ROX), 6-carboxyrhodamine (R6G), lissamine rhodamine B sulfonyl chloride, rhodamine (Rhod), rhodamine B, rhodamine 123, rhodamine X isothiocyanate, sulforhodamine B, sulforhodamine 101 and sulfonyl chloride derivative of sulforhodamine 101 (Texas Red); N,N,N',N'-tetramethyl-6-carboxyrhodamine (TAMRA); tetramethyl Rhodamine, tetramethyl rhodamine isothiocyanate (TRITC); riboflavin; rosolic acid and lathanide chelate derivatives, quantum dots, cyanines, pyrelium dyes, and squaraines. The band (spectrum) of wavelengths emitted by an atom or molecule (fluorochrome) after it has been excited by a photon of light or energy from another light source may be referred to as its emission spectrum. After the fluorochrome has emitted a photon, it returns to the ground-level energy state and is ready for another cycle of excitation and emission. The wavelength range and intensity profile of the fluorescence emission spectrum is generally independent of the excitation wavelength.

In step 46, the segmented image and the target image undergo analysis to determine an intensity distribution of the target (output 48) in the compartments that express the target. In certain embodiments (not shown), the images may be co-registered by any suitable technique in order to align the compartments in the segmenting image and the target image. For embodiments in which the intensity of a target molecule in any compartment, C, is evaluated, the distribution may be estimated using a Parzen window approach with Gaussian kernels:

$$P_C(k) = \sum_{ij} w_{ij} \exp\{-(sk - I_{ij}^T)^2 / 2\sigma^2\}, \quad (1)$$

where weights, $w_{ij}=P(ij \in C)$, are the probability of a pixel belonging to compartment C, $I_{ij}^T$ is the intensity of the target molecule at pixel location ij. The scaling factor, s, is set to the ratio of the dynamic range of the image to the number of bins, N. The density function is normalized such that it adds up to one:

$$P_C(k) \leftarrow P_C(k) / \sum_k P_C(k). \quad (2)$$

The subcellular region where the target molecule is expressed is comprised of non-expressed (or expressed non-specifically, background expression), and expressed regions. The distribution of the target can be formulated by a mixing equation:

$$P_Y(k) = (1-p)P_X(k) + pP_T(k) \quad (3)$$

where the Probability Distribution Function (PDF) of the expressed compartments $P_Y(k)$ is a combination of the $P_X(k)$, the term that represents the non-specific background binding, and the unknown intensity target distribution, $P_T(k)$. As used herein, $P_Y(k)$, $P_X(k)$, and $P_T(k)$ may refer to output, input, and target distributions, respectively. The percent of the target mixing, p, may also be referred to as the mixing factor. Note that in Eq. 3, the target distribution as well as the mixing factor is unknown.

The mixing factor defined in Eq. 3 is used to determine the percent expression of the target molecule in the compartments (output 52) and may be estimated. In addition, outputs 48 and 52 may be used to determine a combined score 58, which may consist of a single number.

In addition to a combined score, intensity distribution 48, which is a distribution and not a single score, may be converted into a strength of expression score at step 55. In certain embodiments, the mixing factor is known. Assuming that the mixing factor is known, two metrics may be used to determine the strength of expression. The first of the two is the Normalized Mean Difference (NMD), defined as the difference between the mean target expression and the mean input expression normalized by the variances, $$NMD = \frac{\mu_T - \mu_X}{\sqrt{\sigma_T^2 + \sigma_X^2}}. \quad (4)$$

Note that the mean and the variance of the target expression in the above equation is unknown. Assuming that the percent of mixing, $\hat{p}$, is known, the NMD can be written by using the known input and output mean and variance values as follows, $$NMD = \frac{\mu_Y - \mu_X}{\sqrt{\hat{p}\sigma_Y^2 + \hat{p}(2\hat{p}-1)\sigma_X^2 + (\hat{p}-1)(\mu_Y - \mu_X)^2}} \quad (5)$$

The above equation may be derived by taking the first and second order moments of Eq. 3, and substituting the target moments in Eq. 4.

The distribution of the output is formulated by the following mixing equation, $$P_Y(k) = (1-p)P_X(k) + pP_T(k). \quad (5.1)$$

The mixing equation (5.1) may represent observed expression of a target molecule. The term p represents the percent expression, defined as the percent of the total compartments expressing the target molecule. The term $P_T(k)$ represents the intensity distribution, defined as the distribution of the intensity of the target molecule in its expressed compartments. Calculating the mean of the output distribution, and substituting the output PDF with the above equation results, $$\mu_Y = \sum_k k P_Y(k) \quad (5.2)$$

$$= \sum_k k((1-p)P_X(k) + pP_T(k)) = (1-p)\mu_X + p\mu_T.$$

Similarly, the second order moment can be written as, $$E[Y^2] = \sum_k k^2 P_Y(k) \quad (5.3)$$

$$= \sum_k k((1-p)P_X(k) + pP_T(k))$$

$$= (1-p)E[X^2] + pE[T^2].$$

Since the variance of a random variable can be expressed as, $$\sigma_T^2 = E[T^2] - (\mu_T)^2, \quad (5.4)$$

from Eqs. 5.2, 5.3, and 5.4, the variance of the target can be written as, $$\sigma_T^2 = p^{-1} E[Y^2] - p^{-1}(1-p) E[X^2] - (p^{-1}\mu_Y - p^{-1}(1-p)\mu_X)^2. \quad (5.5)$$

Substituting $E[Y^2] = \sigma_Y^2 + (\mu_Y)^2$, and $E[X^2] = \sigma_X^2 + (\mu_X)^2$ in the above equation results, $$\sigma_T^2 = p^{-1}\sigma_Y^2 + (1-p^{-1})\sigma_X^2 + (p^{-1} - p^{-2})(\mu_Y - \mu_X)^2. \quad (5.6)$$

Substituting the above equation in Normalized Mean Difference (NMD) then yields, $$NMD = \frac{\mu_T - \mu_X}{\sqrt{\sigma_T^2 + \sigma_X^2}} \quad (5.7)$$

$$= \frac{p^{-1}\mu_Y - p^{-1}(1-p)\mu_X - \mu_X}{\sqrt{p^{-1}\sigma_Y^2 + (1-p^{-1})\sigma_X^2 + (p^{-1} - p^{-2})(\mu_Y - \mu_X)^2 + \sigma_X^2}}.$$

Multiplying numerator and denominator by p, and simplifying the common terms result, $$NMD = \frac{\mu_Y - \mu_X}{\sqrt{p\sigma_Y^2 + p(2p-1)\sigma_X^2 + (p-1)(\mu_Y - \mu_X)^2}}. \quad (5.8)$$

For comparison purposes the NMD between the input and the output may be represent as:

$$NMD_{mixed} = \frac{\mu_Y - \mu_X}{\sqrt{\sigma_Y^2 + \sigma_X^2}}. \quad (6)$$

Note that this metric is a representative metric only when the mixing factor is close to one; indeed it is a special case of Eq. 5 ($\hat{p} \to 1$).

The second metric that may be used to determine the strength of expression (output 56) is the Logarithmic Mean Difference (LMD) defined as, $$LMD = \log(\mu_T) - \log(\mu_X) \quad (7)$$

Similarly by substituting the mean of the target distribution with the mixed mean of the input and output distributions in the above equation, LMD can be written in the following form as a function of the known input and output distributions, $$LMD = \log(\mu_Y - (1-\hat{p})\mu_X) - \log(\mu_X) - \log(\hat{p}). \quad (8)$$

The percent expression (output 52), discussed in more detail below, may also be used to compute NMD and LMD from the above equations.

A summary of methods for determining the strength of expression at step 55 and the percentage of expression are provided below. The intensity distribution (output 48) is generally a total distribution, and is, thus, not typically a single numerical value. However, the intensity distribution (output 48) may be used to calculate a strength of expression score, which may be a single numerical indicator. As noted below, the strength of expression score may be determined by normalized mean difference or logarithmic mean difference using the intensity distribution of the target molecule (output 48). Nomenclature categorized by the metrics and methods is illustrated in Table 1.

TABLE 1

Nomenclature categorized by the Metrics and Methods.

|  |  | Equal Variance Solution (EV) | Signed Kolmogorov Smirnov (sKS) | Constraint Minimization Solution (CM) | Uni-Modal Solution (UM) |
|---|---|---|---|---|---|
| | Percent of Expression (output 52) | $\hat{p}_{EV}$ | $\hat{p}_{sKS}$ | $\hat{p}_{CM}$ | $\hat{p}_{UM}$ |
| Strength of Expression | Normalized Mean Difference (NMD) | $NMD_{EV}$ | $NMD_{sKS}$ | $NMD_{CM}$ | $NMD_{UM}$ |
| | Logarithmic Mean Difference (LMD) | $LMD_{EV}$ | $LMD_{sKS}$ | $LMD_{CM}$ | $LMD_{UM}$ |

In one embodiment, an equal variance solution may be used in which the input and the target have comparable variances. The mixing factor can be directly calculated by using the following ratio, $$\hat{p}_{EV} = \frac{(\mu_Y - \mu_X)^2}{\sigma_Y^2 - \sigma_X^2 + (\mu_Y - \mu_X)^2}, \quad (9)$$

Substituting this in the NMD and LMD results in the corresponding strength measures:

$$NMD_{EV} = \frac{\mu_Y - \mu_X}{\sqrt{\hat{p}_{EV}\sigma_Y^2 + \hat{p}_{EV}(2\hat{p}_{EV} - 1)\sigma_X^2 + (\hat{p}_{EV} - 1)(\mu_Y - \mu_X)^2}}, \quad (10)$$

$$LMD = \log(\mu_Y - (1 - \hat{p}_{EV})\mu_X) - \log(\mu_X) - \log(\hat{p}_{EV}). \quad (11)$$

Taking the derivative of $\sigma_T^2$ in Eq. 5.6 with respect to p, and equating to zero yields a specific mixing factor where the variance of the target distribution is maximum, $$\frac{\partial \sigma_T^2}{\partial p} = -p^{-2}\sigma_Y^2 + p^{-2}\sigma_X^2 - (p^{-2} - 2p^{-3})(\mu_Y - \mu_X)^2 = 0 \quad (11.1)$$

Let p* denote the solution to the above equation, $$p^* = \frac{2(\mu_Y - \mu_X)^2}{\sigma_Y^2 - \sigma_X^2 + (\mu_Y - \mu_X)^2}. \quad (11.2)$$

By analyzing the second derivatives it can be shown that the variance has a maximum at p*. Substituting this mixing value into the original mixing equation yields a mixed distribution, $$P^*_T(k) = (P_Y(k) - (1-p^*)P_X(k))/p^* \quad (11.3)$$

Assuming that the target and input has comparable variance (Equal Variance Assumption), the maximum variance can be achieved only if $$P^*_T(k) = (P_T(k) + P_X(k))/2. \quad (11.4)$$

Equating the above two equations and taking the first order moment results, $$(\mu_Y - (1-p^*)\mu_X)/p^* = (\mu_T + \mu_X)/2. \quad (11.5)$$

Solving for p* yields, $$p^* = \frac{2(\mu_Y - \mu_X)}{\mu_T - \mu_X}. \quad (11.6)$$

From Eqs. 11.2 and 11.6, the equation may be solved for $\mu_T$, $$\mu_T = \frac{\sigma_Y^2 - \sigma_X^2}{\mu_Y - \mu_X} + \mu_Y. \quad (11.7)$$

Substituting this into Eq. 11.6 yields, $$\hat{p} = \frac{(\mu_Y - \mu_X)^2}{\sigma_Y^2 - \sigma_X^2 + (\mu_Y - \mu_X)^2}. \quad (11.8)$$

Note that the same result can be achieved via a simpler derivation where the equal variance constraint is used explicitly.

In another embodiment, a Kolmogorov-Smirnov (KS) distance may be used to calculate the difference between the distributions. The associated test to measure the statistical significance is commonly used in statistics and known as the Kolmogorov Significance Test. A modified version of the KS distance is used to indicate which compartment demonstrates appreciable expression of the target or demonstrates an expression level of the target greater than one or more other compartments (e.g., nucleus vs. cytoplasm). Given the PDF (Eq. 2), the cumulative distribution function (CDF) is calculated;

$$F_C(k) = \sum_{\tau=0}^{k} P_C(\tau). \quad (12)$$

The positive one-sided Kolmogorov-Smirnov (KS) test statistic between two distributions is given as, $$D^+_{XY} = \max_k (F_X(k) - F_Y(k)). \quad (13)$$

The expression level where the maximum positive cumulative differentiation achieved at is denoted by $$k^+_{XY} = \operatorname{argmax}_k (F_X(k) - F_Y(k)). \quad (14)$$

Similarly, the negative one-sided KS test and the associated expression level is calculated and denoted by, $$D^-_{XY} = \max_k (F_Y(k) - F_X(k)) = D^+_{YX}, \quad (15)$$

$$k^-_{XY} = \operatorname{argmax}_k (F_Y(k) - F_X(k)) = k^+_{YX}. \quad (16)$$

Note that the negative one-sided KS test is identical to positive one-sided KS test except that the order of the distributions is swapped.

A signed KS (sKS) distance may be defined as follows:

$$D_{XY} = \begin{cases} D^+_{XY} & \left|\frac{D^+_{XY}}{D^-_{XY}}\right| \geq T \\ -D^-_{XY} & \left|\frac{D^+_{XY}}{D^-_{XY}}\right| \geq \frac{1}{T} \\ D^+_{XY} & \frac{1}{T} < \left|\frac{D^+_{XY}}{D^-_{XY}}\right| < T, k^+_{XY} > k^-_{XY} \\ -D^-_{XY} & \frac{1}{T} < \left|\frac{D^+_{XY}}{D^-_{XY}}\right| < T, k^+_{XY} \leq k^-_{XY} \end{cases} \quad (17)$$

where the threshold, T, may be set to 10 in one embodiment. In other embodiments, the threshold may be set to any suitable value between 5 and 15. Note that this is identical to commonly used KS distance when the threshold is set to one. This new sKS distance is intentionally set to bias the distance that occurs at the high expression levels (last two conditions in the lower two expressions in Eq. (17). The metric $D_{XY}$ is defined as a signed metric, where the positive values indicate the higher expression of the Y distribution, and the negative values indicate the higher expression of the X distribution. This is particularly important to identify which distribution is expressed higher in addition to the level of expression.

The sign of the sKS distance indicates which compartment or compartments express the target. For example, if the sKS is defined between nuclear $F_x(x)$ and membrane $F_y(y)$ distributions, the negative sign indicates that the target is expressed in the membrane. Likewise, if the sKS distance is defined between membrane $F_x(x)$ and nuclear $F_y(y)$ distributions, the negative sign indicates that the target is expressed in the nuclei. This information is utilized to determine which distribution is input and which one is output. In other word, other techniques may retain the sign of their metric from the sKS metric. Since the sKS distance is a metric defined in the probability domain, the percent of expression is denoted as the absolute value of the sKS distance, $\hat{p}_{sKS}=|D_{XY}|$, and the corresponding $NMD_{sKS}$, and $LMD_{sKS}$ is computed using Eqs. 10 and 11. This is a valid assumption when the means of the input and output distributions are several standard deviations apart. For the contrary case, this metric is a mixed metric compounded by the percent and strength of expression. The sKS metric may be used to initialize other techniques.

In another embodiment, a Constrained Minimization (CM) Solution may be used to estimate expression levels. A direct solution of the mixed distribution can be formulated as a constraint least squares problem, $$\min_{p,P_T(k)} \sum_{k=1}^{N} (P_Y(k) - (1-p)P_X(k) - pP_T(k))^2 \quad (18)$$

$$\text{s.t.} \sum_{k=1}^{N} P_T(k) = 1, \ 0 \le p \le 1, \ 0 \le P_T(k) \le 1, \forall k.$$

However this equation generates a trivial solution at p=1. Additional constraints are may prevent the trivial convergence of the algorithm. Since the target distribution is known to be expressed higher than the non-specific background expression, it may be advantageous to impose the constraints on the upper bounds of the low levels of expression. Specifically the following cost function may be optimized with the tighter constraints;

$$\min_{p,P_T(k)} \sum_{k=1}^{N} (P_Y(k) - (1-p)P_X(k) - pP_T(k))^2 \quad (19)$$

$$\text{s.t.} \sum_{k=1}^{N} P_T(k) = 1,$$

$$0 \le p \le 1, \ 0 \le P_T(k) \le \varepsilon, \forall k \le \mu_X,$$

$$0 \le P_T(k) \le 1, \forall k > \mu_X,$$

where $\varepsilon=1/N$, and $\mu_X$ is the mean value of the input distribution. The above equation is solved by standard constraint optimization methods. This solution is referred to here as Constraint Minimization (CM) solution. The corresponding strength measures, denoted by $NMD_{CM}$ and $LMD_{CM}$ are calculated using Eqs. 10 and 11.

In another embodiment, a projection technique may be used. A projection method is an alternative constraint optimization technique where nonlinear constraints may be incorporated. In the following equation, a unimodality constraint forces the target distribution to have a single peak, $$\min_{p,P_T(k)} \sum_{k=1}^{N} (P_Y(k) - (1-p)P_X(k) - pP_T(k))^2 \quad (20)$$

$$\text{s.t.} \sum_{k=1}^{N} P_T(k) = 1, \ 0 \le p \le 1,$$

-continued $$P_T(k-1) \le P_T(k), \ \forall k \le m_T,$$

$$P_T(k-1) \ge P_T(k), \ \forall k \le m_T, \ m_T \ge \mu_X$$

where $m_T$ denotes the mode of the target distribution. The projection method solves this equation iteratively, by first assuming that the mixing value is known and the target distribution is estimated, the constraints are imposed on the solution by enforcing unimodality and setting all negative values to zero. Then the target distribution is assumed to be known, and the mixing factor is estimated. In certain embodiments, the iterations continue for a fixed number of iterations, while in other embodiments the iterations may continue until convergence. Note that the convergence is not guaranteed in projection methods. Therefore, if there is no convergence, the iterations may stop after a set number of iterations have been performed. The percentage estimate by the sKS method, $\hat{p}_{sKS}$, may be used to initialize the iterations. This solution is referred to herein as the uni-modal (UM) solution, and the corresponding metrics are denoted by, $\hat{p}_{UM}$, $NMD_{UM}$, and $LMD_{UM}$.

The forgoing methods provide herein do not require any thresholds. Accordingly, user intervention in the form of threshold setting is not required in order to apply the present techniques to image analysis.

With the forgoing in mind, the following examples provide specific embodiments in which the present techniques have been applied. The below applications are examples in which the present techniques may be used to correlate certain scores, such as the percent expression 52 and the intensity distribution of the target 48, with clinical data to make a clinical determination. For examples, outputs 48 and 52 may be used to identify biological samples that are likely to be associated with certain types of clinical conditions, such as cancer. In one embodiment, the combined score is determined by combining outputs 48 (intensity distribution) and 52 (percent expression) and is used to determine a clinical outcome. In another embodiment (not shown), the combined score is determined by combining outputs 52 (percent expression) and the strength of expression score. In one embodiment, a combined score 58 may be used as a threshold or scale that may be correlated with clinical outcomes that have been previously determined by empirical methods. In another method, the present techniques may be used to validate other methodologies.

Figure 3A:
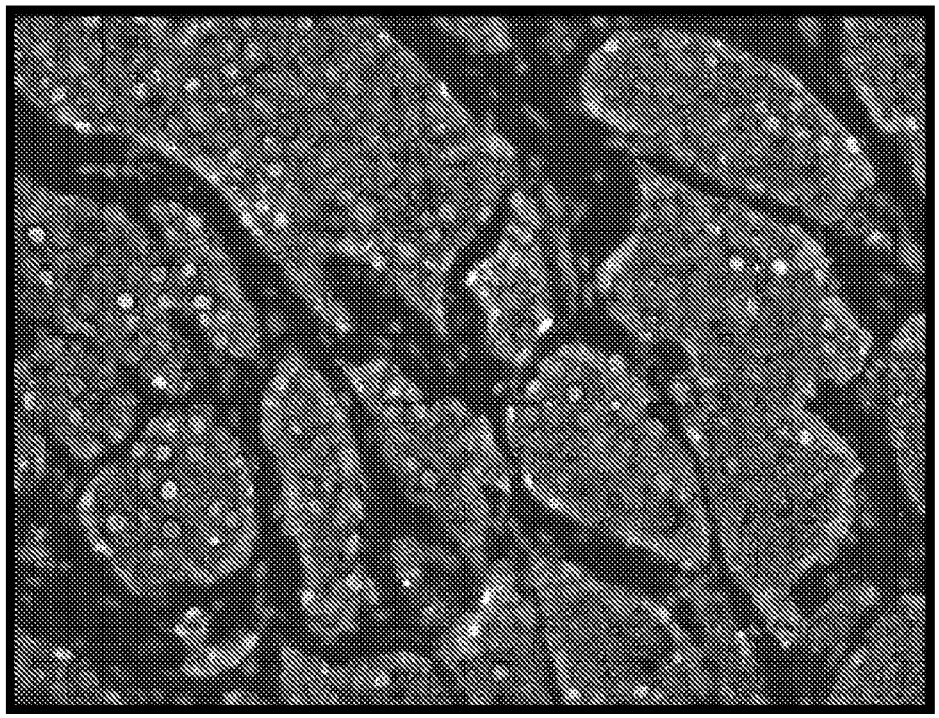
FIG. 3A is a fluorescent image of a breast cancer tissue sample stained with a probe for estrogen receptor, a probe for pan-cadherin (membrane) expression, and a probe for DAPI (nuclear) expression.
Figure 3B:
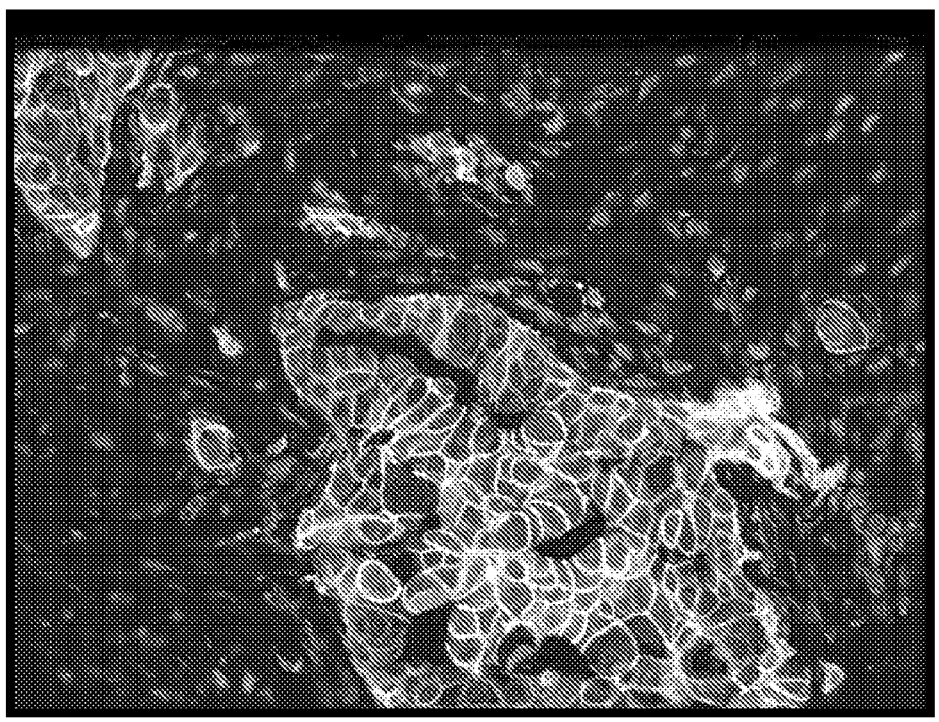
FIG. 3B is a fluorescent image of a breast cancer tissue sample stained with a probe for Her2, a probe for pan-cadherin (membrane) expression, and a probe for DAPI (nuclear) expression.
Figure 3C:
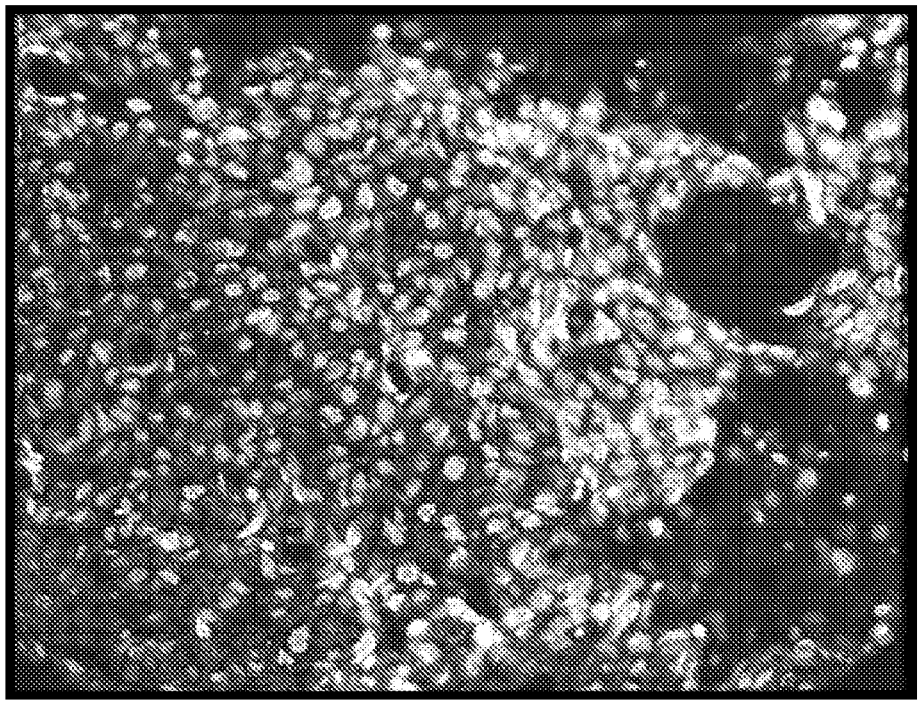
FIG. 3C is a fluorescent image of a breast cancer tissue sample stained with a probe for androgen receptor, a probe for pan-cadherin (membrane) expression, and a probe for DAPI (nuclear) expression.
Figure 3D:
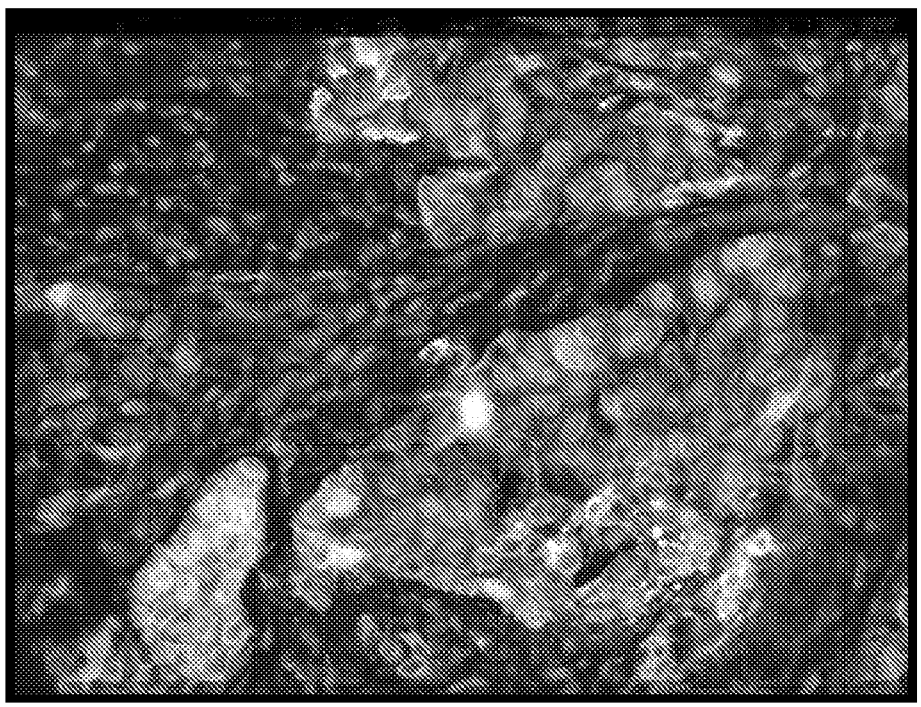
FIG. 3D is a fluorescent image of a breast cancer tissue sample stained with a probe for TP53, a probe for pan-cadherin (membrane) expression, and a probe for DAPI (nuclear) expression.

FIGS. 3A-D, as discussed with regard to step 43 of FIG. 2, are images of cells immunohistochemically stained to highlight proteins that may have diagnostic, prognostic and predictive value. These images demonstrate that cancer biomarkers show variation in the location, strength, and percentage of expression across the cells. In all of the images, the cells are previously stained with probes specific for the membrane and nuclear compartments in addition to probes specific for cancer biomarkers. For example, the expression level and percentage of estrogen receptor expression in nuclei may be evaluated to determine estrogen receptor protein status in breast cancer patients (FIG. 3A). FIG. 3B shows an image of a breast cancer tissue sample stained with fluorescent probes specific for Her2. FIG. 3C shows an example of a fluorescent image with positive androgen receptor staining in the nuclei. FIG. 3D shows an example of a fluorescent image with positive TP53 staining in nuclei.

Figure 4C:
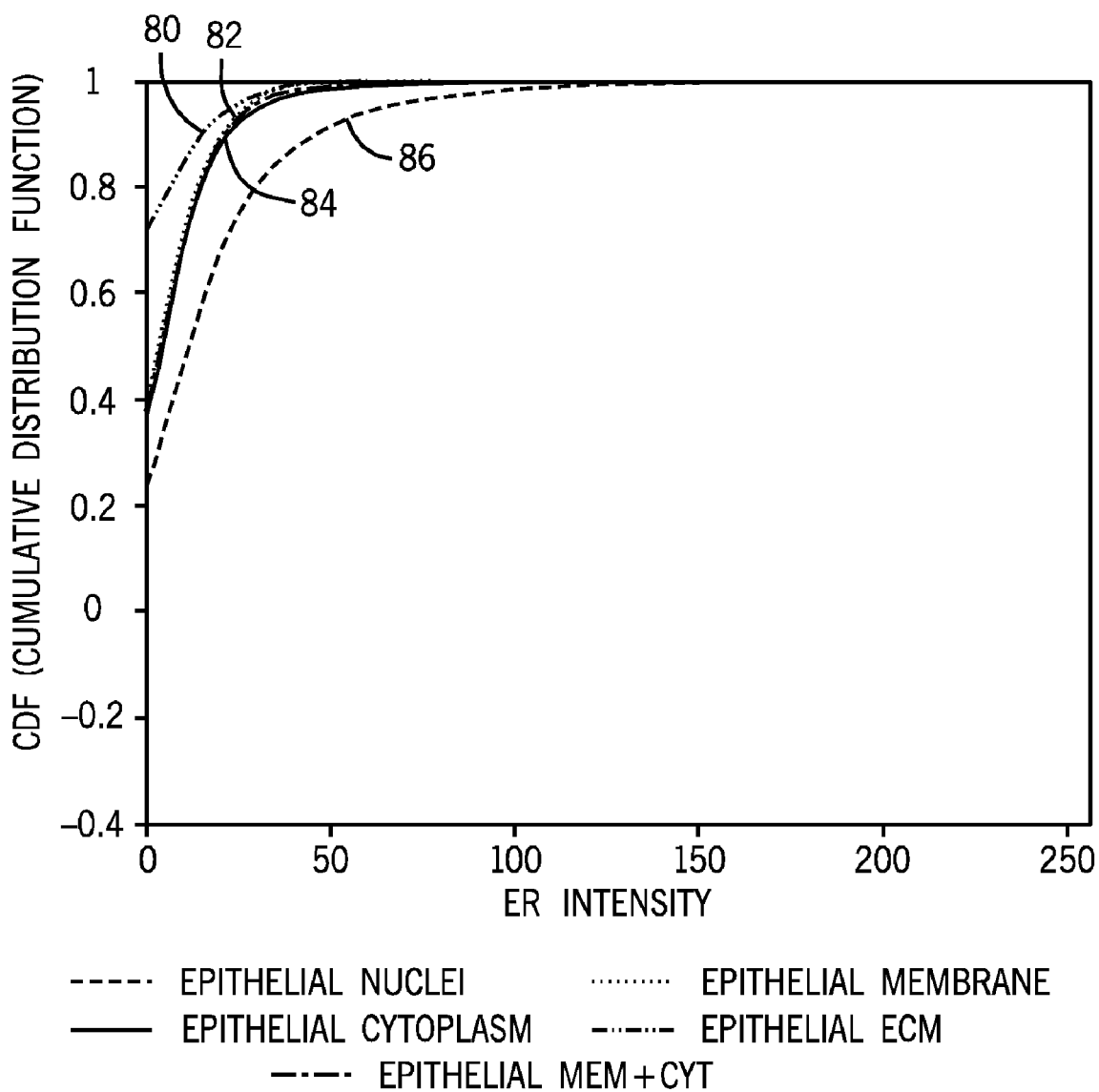
FIG. 4C is a graph of the cumulative distribution function for the nuclear, membrane, and cytoplasmic compartments for the image in FIG. 3A.
Figure 4D:
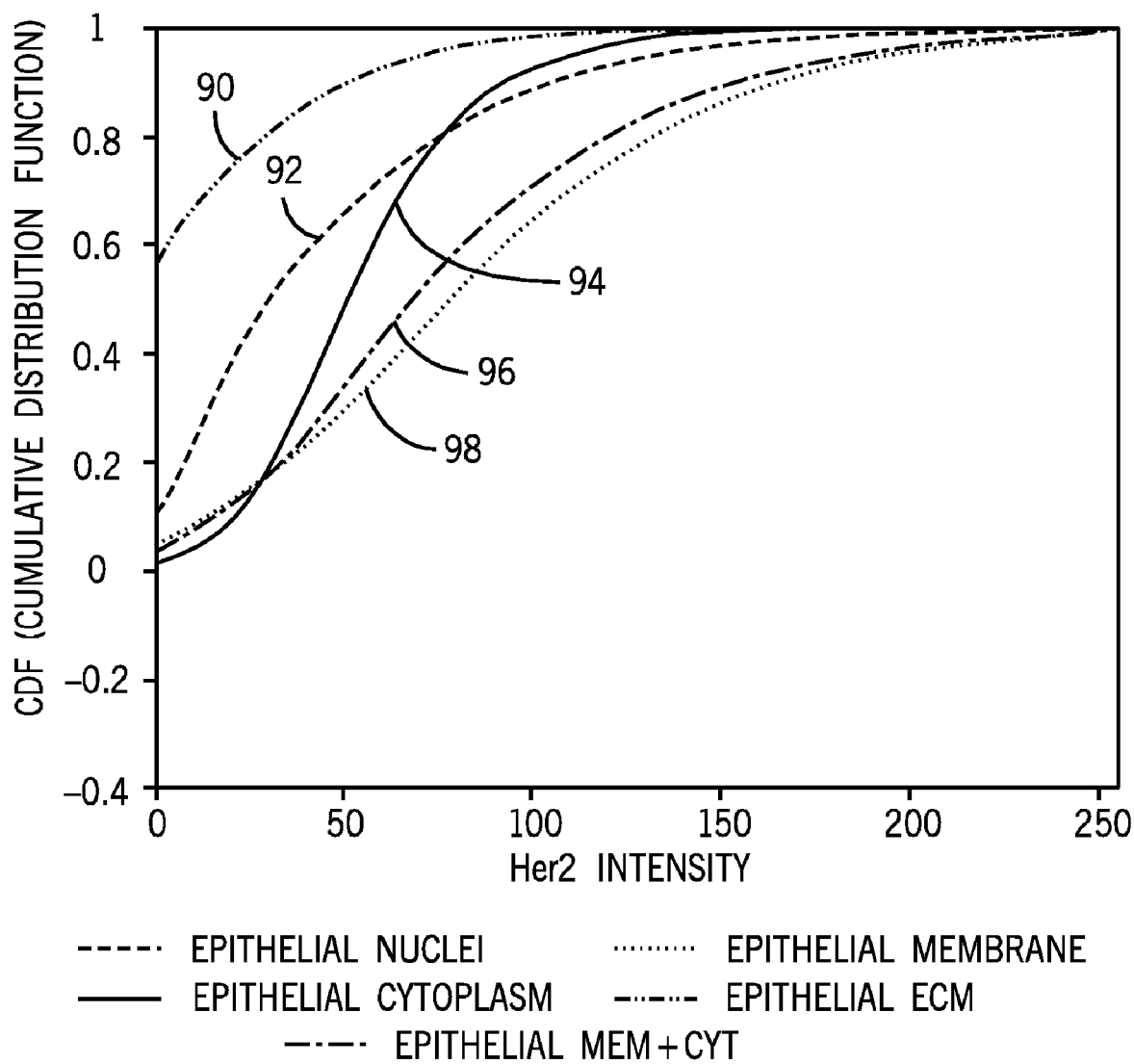
FIG. 4D is a graph of the cumulative distribution function for the nuclear, membrane, and cytoplasmic compartments for the image in FIG. 3B.
Figure 4E:
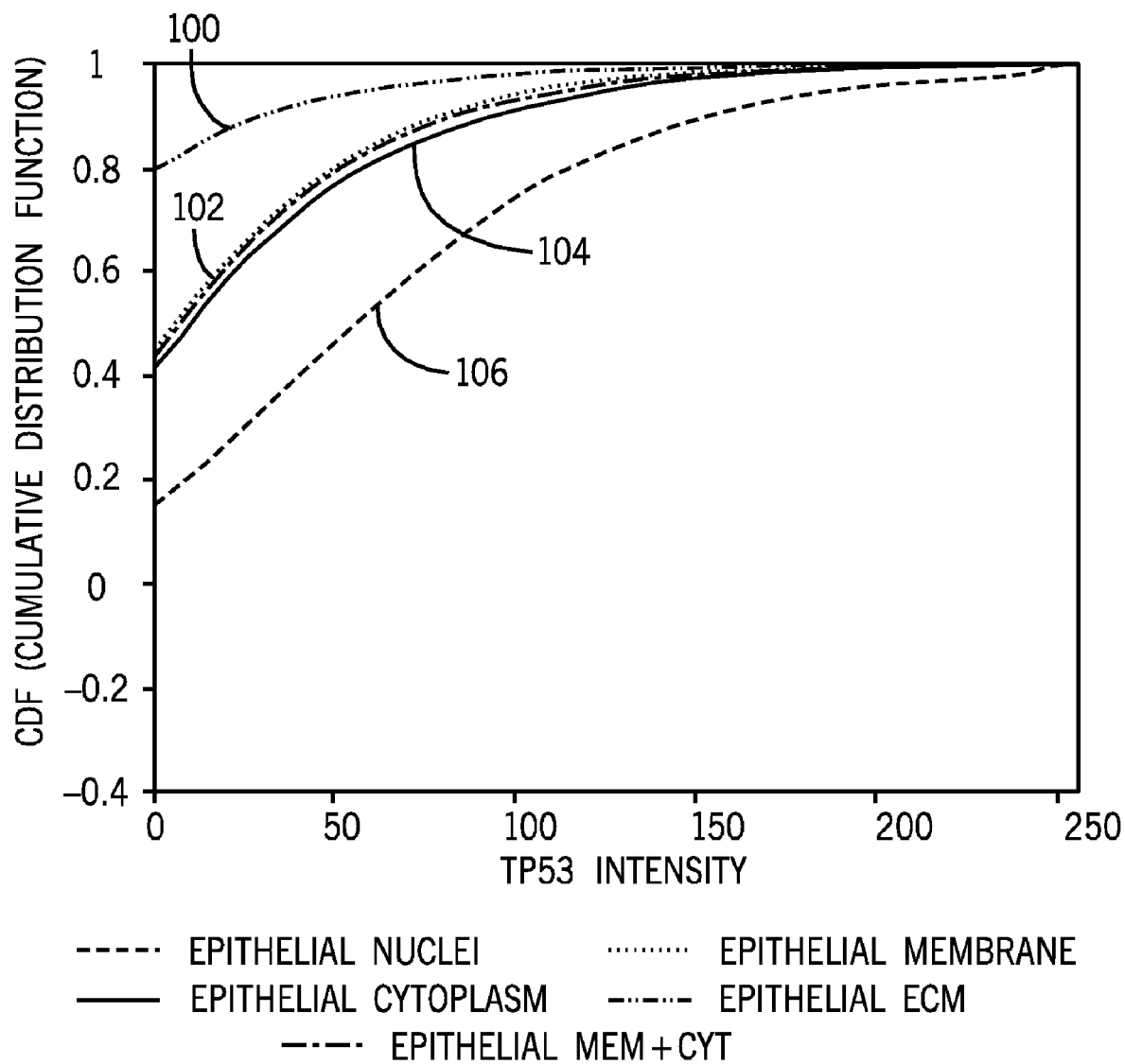
FIG. 4E is a graph of the cumulative distribution function for the nuclear, membrane, and cytoplasmic compartments for the image in FIG. 3D.
Figure 4F:
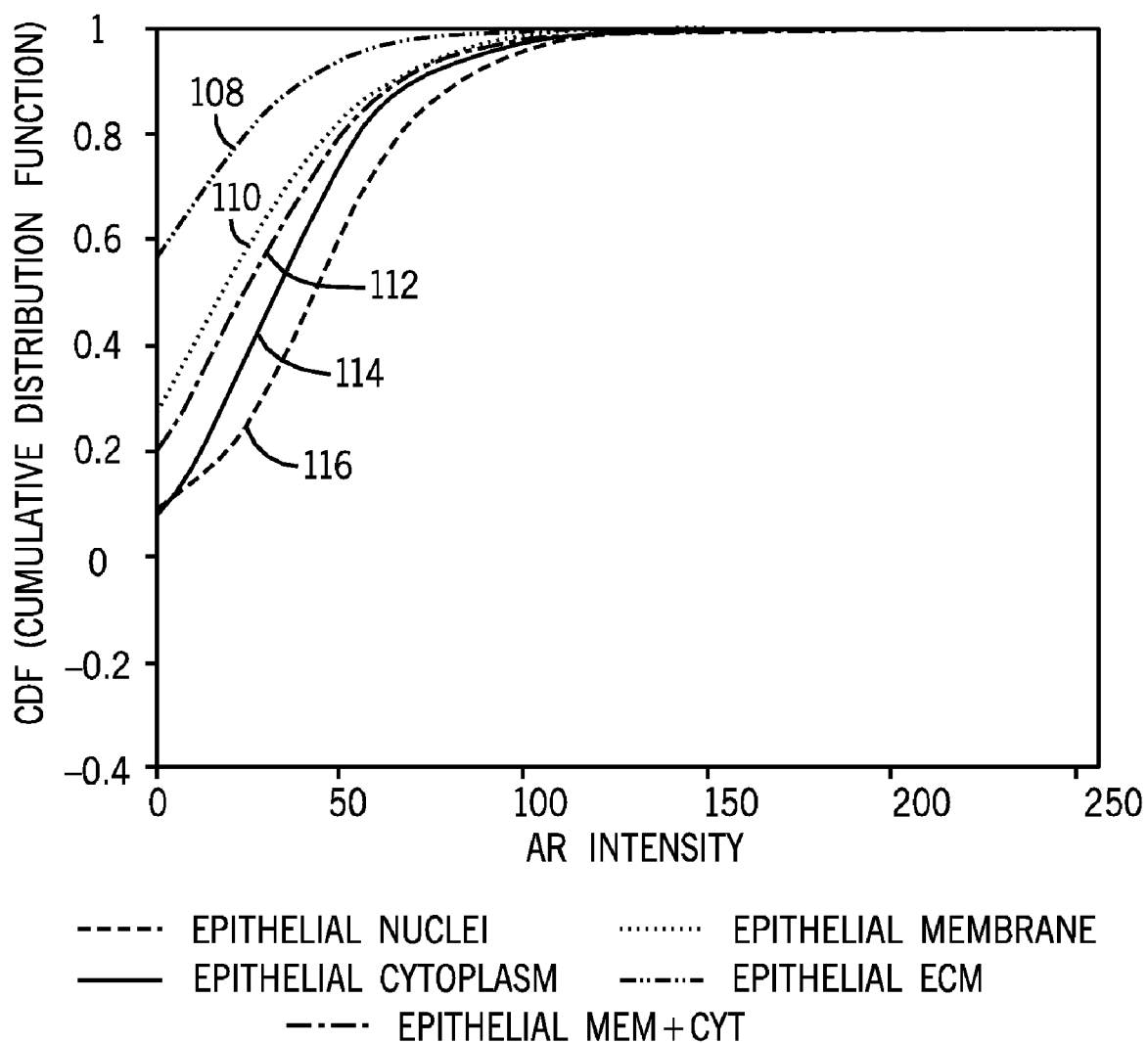
FIG. 4F is a graph of the cumulative distribution function for the nuclear, membrane, and cytoplasmic compartments for the image in FIG. 3C.

The image in FIG. 4A shows segmented regions using the compartmental markers shown in FIG. 3A. Epithelial regions are highlighted that have been stained for cytoplasmic regions (reference 60), nuclei regions (reference 62), and membrane regions (reference 64). The expression levels of the target markers were calculated only on the epithelial regions. Depending on the expected expression regions of the target molecule, the expression levels may be calculated for non-epithelial regions only, or for all regions. For example, the image in FIG. 4A may be analyzed without excluding the contributions of the non-epithelial regions. The distributions of a target protein (FIG. 3A) on each of the epithelial regions are shown in FIG. 4B, where nuclear (reference 76), membrane (reference 74), and cytoplasmic (reference 72) distributions are plotted as well as the distribution of the extracellular matrix (reference 70). FIGS. 4C-4F show the CDF of the target distributions shown in FIGS. 3A-3D, on each of the subcellular regions. In FIG. 4C the extracellular matrix (reference 80), nuclear (reference 86), membrane (reference 82), and cytoplasmic (reference 84) distributions are plotted. In FIG. 4D the extracellular matrix (reference 90), nuclear (reference 92), membrane (reference 98), cytoplasmic (reference 94) and the summation of the cytoplasmic and membrane (reference 96) distributions are plotted. In FIG. 4E the extracellular matrix (reference 100), nuclear (reference 106), membrane (reference 102), and cytoplasmic (reference 104) distributions are plotted. In FIG. 4F the extracellular matrix (reference 108), nuclear (reference 116), membrane (reference 110), cytoplasmic (reference 114) and the summation of the cytoplasmic and membrane (reference 112) distributions are plotted. The CDFs and the associated sKS distances were used to determine which compartment was expressed. For example, Her2 is expressed on the membrane for the tissue shown in FIG. 3B. The membrane-nuclei sKS metric is estimated as 0.36 indicating strong membrane staining. Similarly, the nuclear androgen receptor staining shown in FIG. 3C was very strong. In particular, the estimated sKS membrane-nuclei metric was −0.36. FIG. 4C shows the CDFs that clearly indicate the over-expression of the nuclear region where approximately 10% of the nuclear pixels express intensity values more than 50, as opposed to a very small percentage for the other compartments. A sample membrane expression is shown in FIG. 3D. The TP53 protein shown in FIG. 3D shows both nuclear and cytoplasmic expression compared to membrane.

As noted, in FIGS. 4B-E, the epithelial/tumor tissue is differentiated from the stromal tissue using an epithelial marker (keratin) image. For example, for the distributions shown in FIGS. 4C, 4D and 4E, the CDF difference between the membrane and the nuclei is a non-negative function. Therefore the smaller of the two one-sided KS distances is always zero. For these distributions, Eq. (17) gives the same results as the conventional KS distance. However, if the difference between the CDF's is not strictly non-negative or non-positive, the peak that is expressed at the higher values are taken as the true expression levels.

To simulate the target expression levels, and background binding given in Eq. 3, two random variables from Gaussian distributions were generated with known mean and standard deviations;

$$P_X(k)=N(\mu_1,\sigma),$$

$$P_T(k)=N(\mu_2,\sigma). \quad (21)$$

While $\mu_1$ is fixed, $\mu_2$ is varied from $\mu_1$ to $3\mu_1$, the standard deviation is fixed for both distributions and set to $\sigma=0.3\mu_1$. NMD in Eq. 4 was used as the metric for computing the strength of expression, therefore the theoretical range for the strength is limited to $\lfloor 0,\sqrt{2}/0.3 \rfloor=[0,4.71]$ with the defined mean and standard deviation values. For each value of the simulated target distribution mean, the mixing factor is varied for all possible values, $p\in[0,1]$.

Figure 5A:
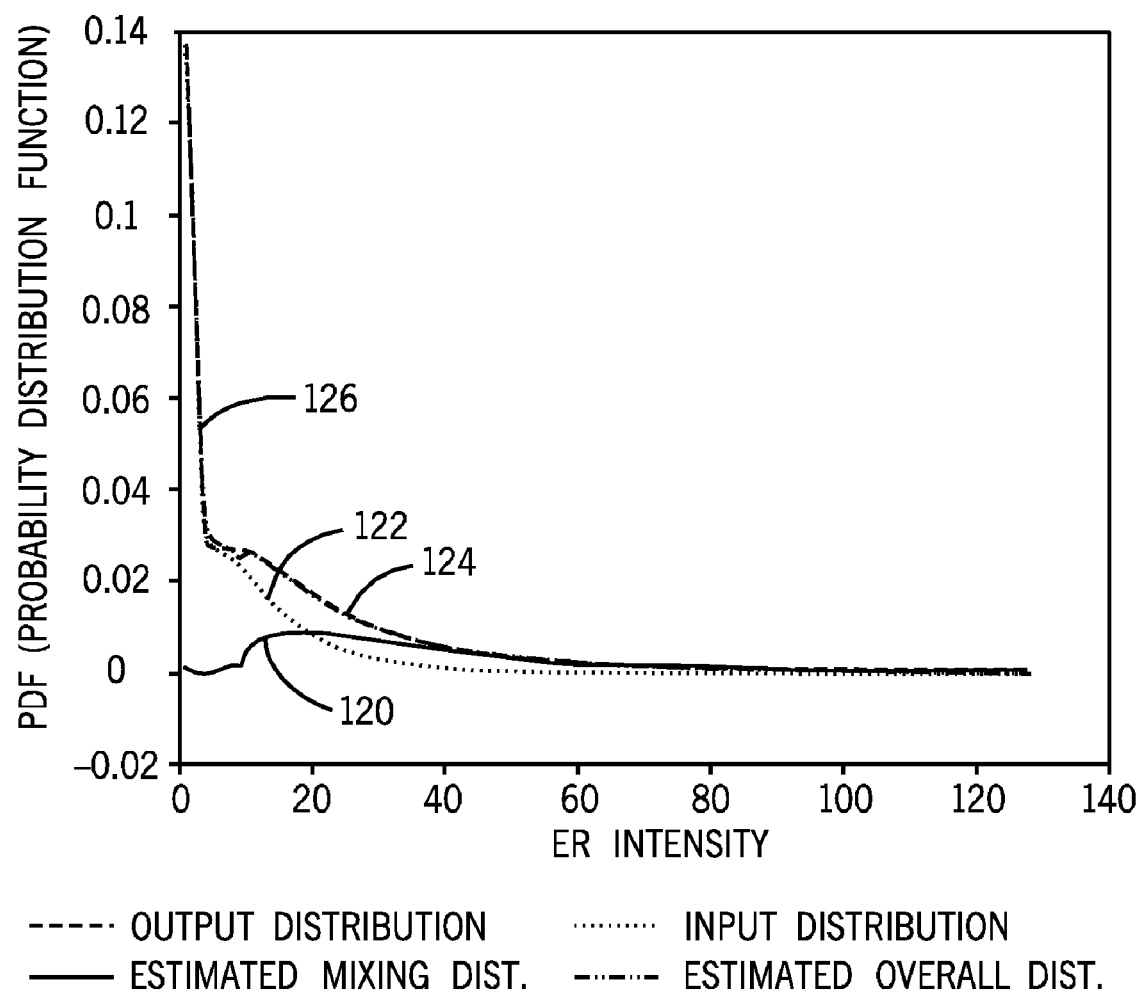
FIG. 5A is a graph of decomposition into mixing components performed by the constrained minimization method of the image of FIG. 3A.
Figure 5B:
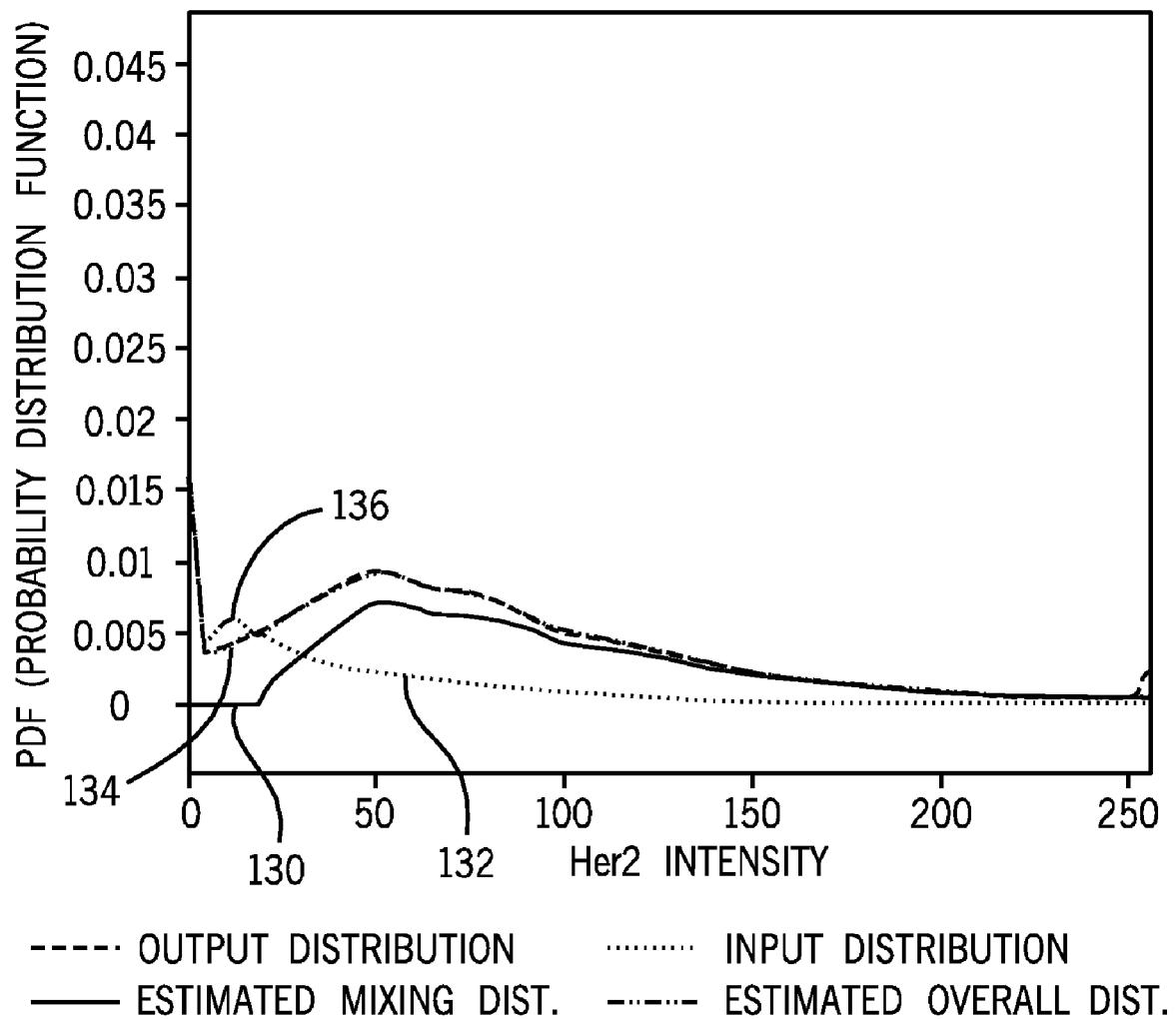
FIG. 5B is a graph of the decomposition into mixing components performed by the projection method with uni-modal constraints method of the image of FIG. 3B.
Figure 6A:
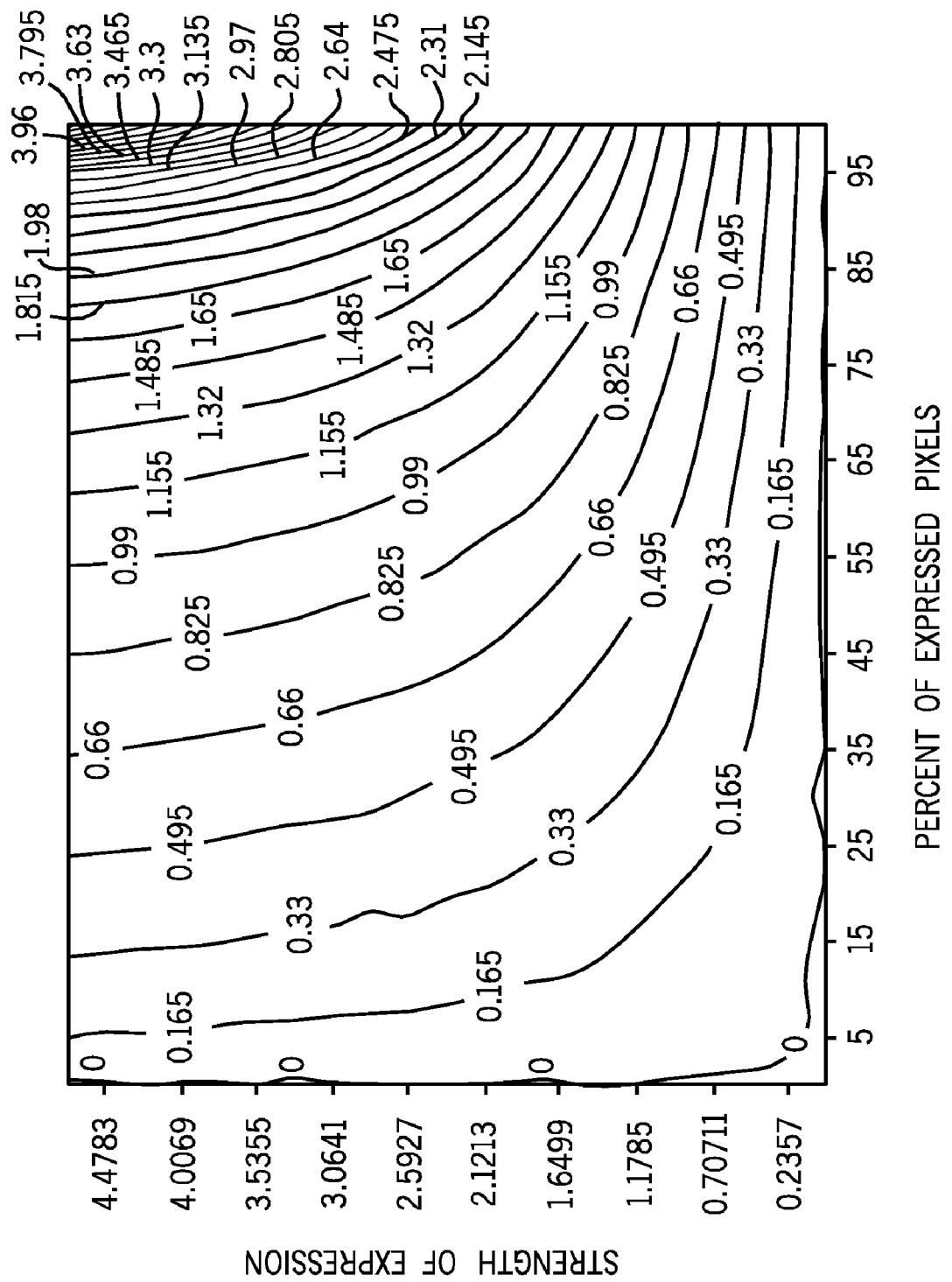
FIG. 6A is a graph of the strength of estimated expression levels between a target distribution and an input distribution with a mixed distribution, prior to deconvolution.
Figure 6B:
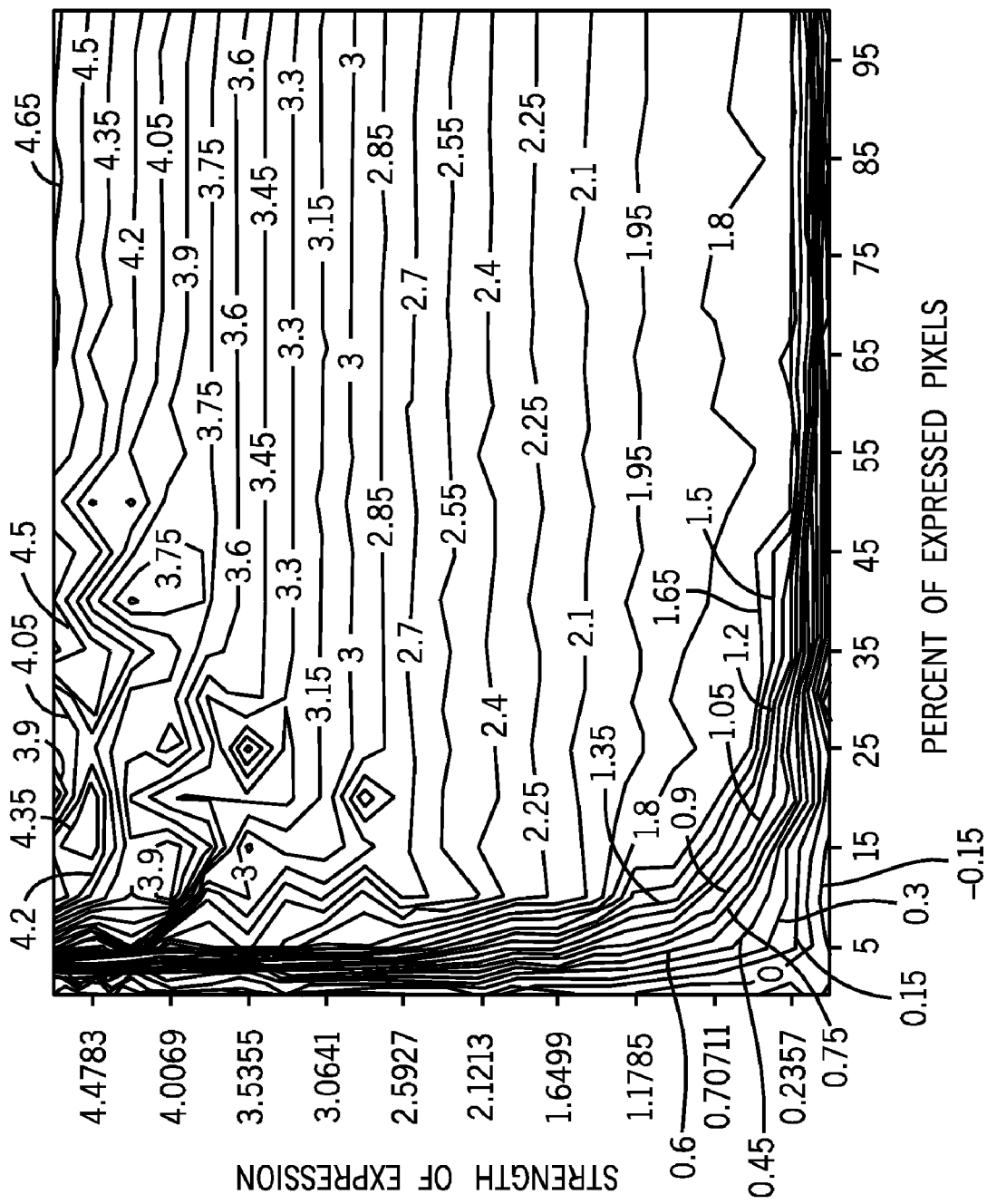
FIG. 6B is a graph of the strength of estimated expression levels between a target distribution and an input distribution estimated by a signed Kolomogorov-Smirnov Distance.
Figure 6C:
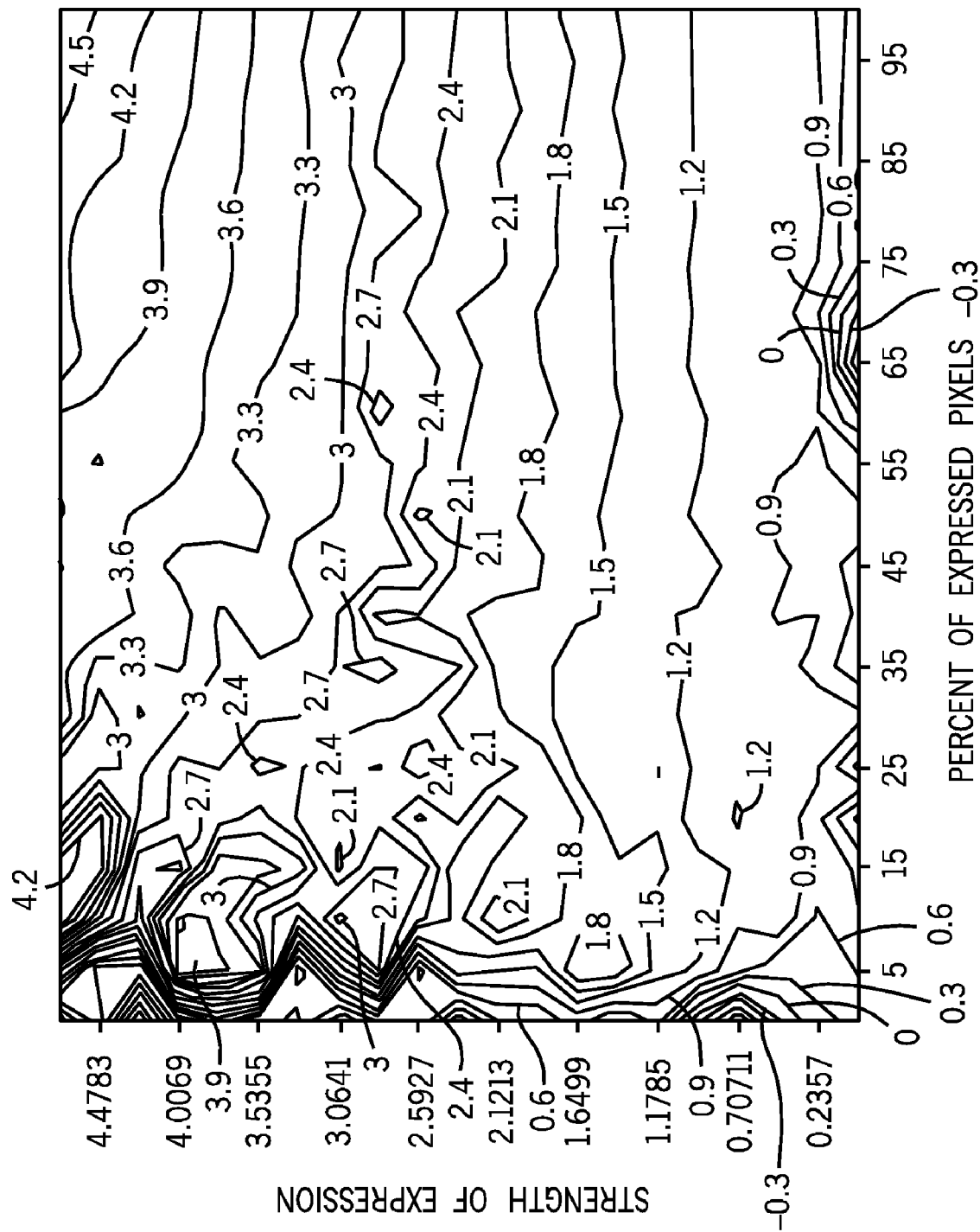
FIG. 6C is a graph of the strength of estimated expression levels between a target distribution and an input distribution estimated by a constrained minimization solution.
Figure 6D:
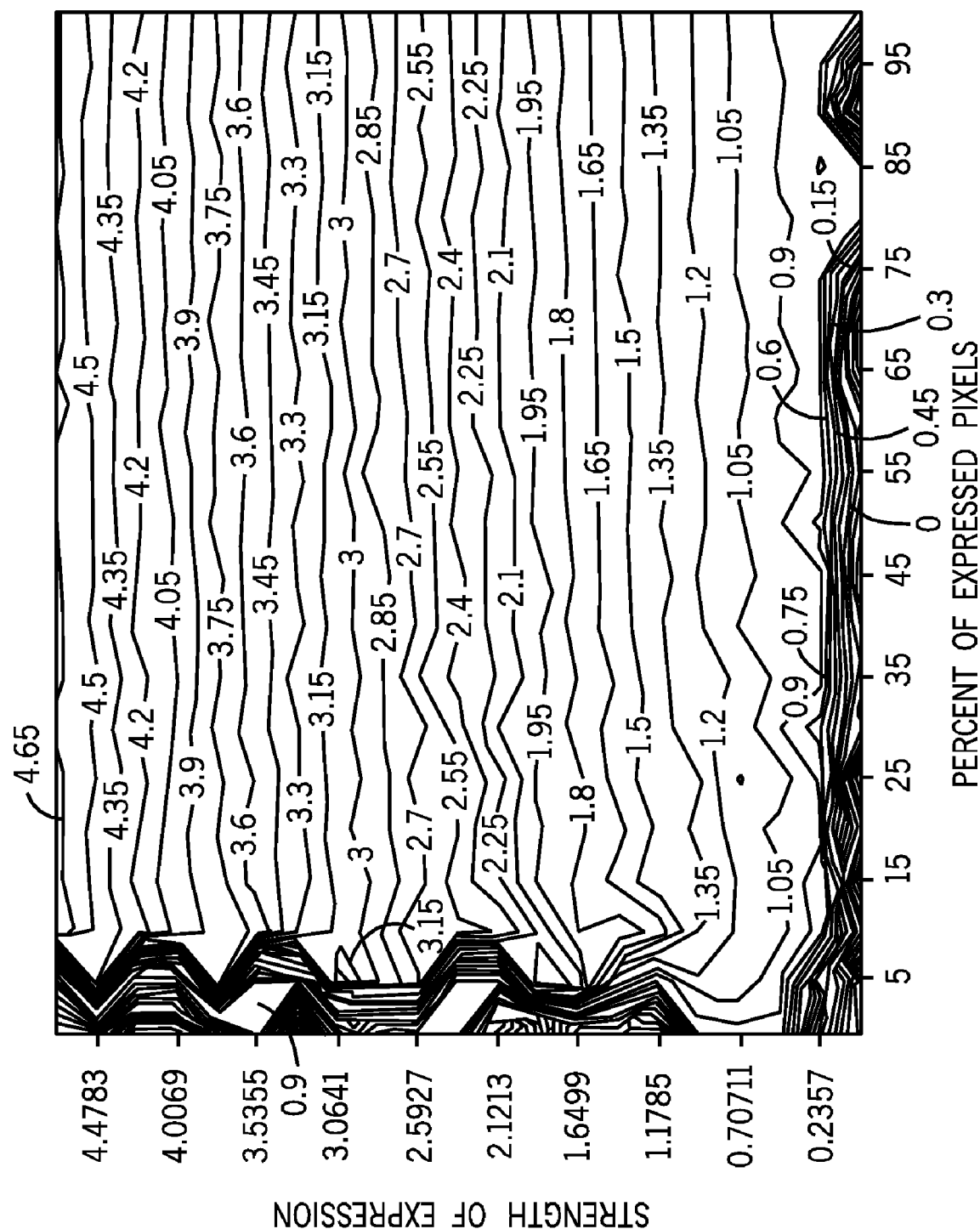
FIG. 6D is a graph of the strength of estimated expression levels between a target distribution and an input distribution estimated by a projection method with uni-modal constraints.

FIG. 5A and FIG. 5B are graphs showing sample decomposition of the mixed distribution using a constrained minimization solution (FIG. 5A) on an image stained with an ER-specific marker and a projection method with uni-modal constraints (FIG. 5B) on an image stained with a Her2-specific marker. For FIG. 5A the line indicated by reference 124 represents the mixed output distribution, while the line indicated by reference 122 represents the input distribution multiplied by a mixing factor. The line indicated with reference 120 is the estimated target distribution multiplied by its percentage, and the line indicated by reference 126 represents the calculated mixed distribution by adding the input distribution multiplied by the mixing factor and the estimated target distribution multiplied by its percentage. For FIG. 5B the line indicated by reference 136 represents the mixed output distribution, while the line indicated by reference 132 represents the input distribution multiplied by a mixing factor. The line indicated with reference 130 is the estimated target distribution multiplied by its percentage, and the line indicated by reference 134 represents the calculated mixed distribution by adding the input distribution multiplied by the mixing factor and the estimated target distribution multiplied by its percentage.

FIGS. 6A-D show the estimated NMD values by using different techniques. The simulation was run for all-possible percent of expression levels (x-axis) in 5% increments, and for a range of NMD values. The estimated values are superimposed on the contour plots. In the NMD test, the contours are expected to be horizontal, and the estimated values (printed on the contours) match the theoretical values (y-axis). $NMD_{mixed}$ (NMD computed between the input and the mixed distribution present in Eq. 6) failed to capture the expression levels. On the other hand, $NMD_{UM}$ (Projection method) performed closest to the theoretical values.

Figure 7A:
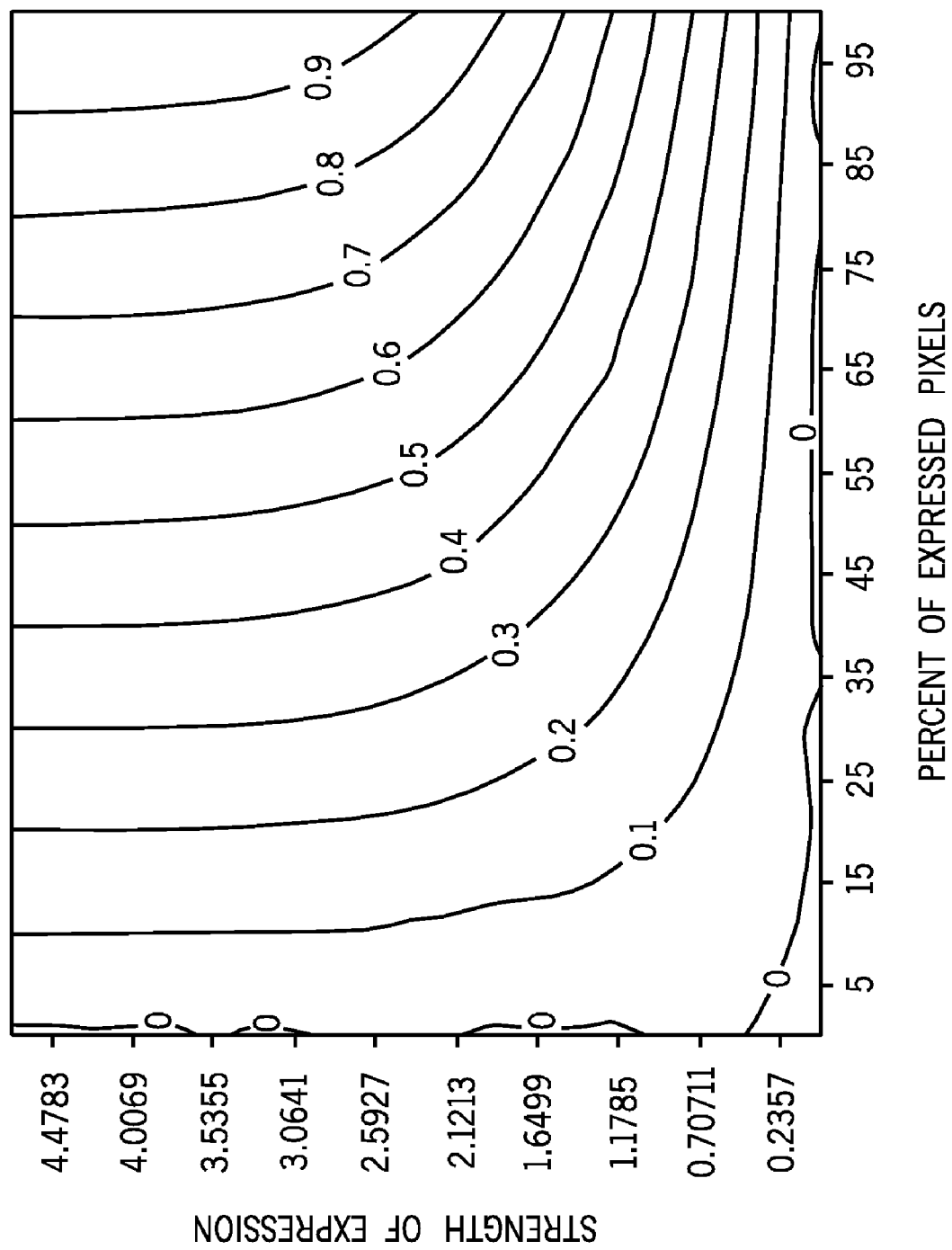
FIG. 7A is a graph of the percent of estimated expression levels between a target distribution and an input distribution estimated by a signed Kolomogorov-Smirnov Distance.
Figure 7B:
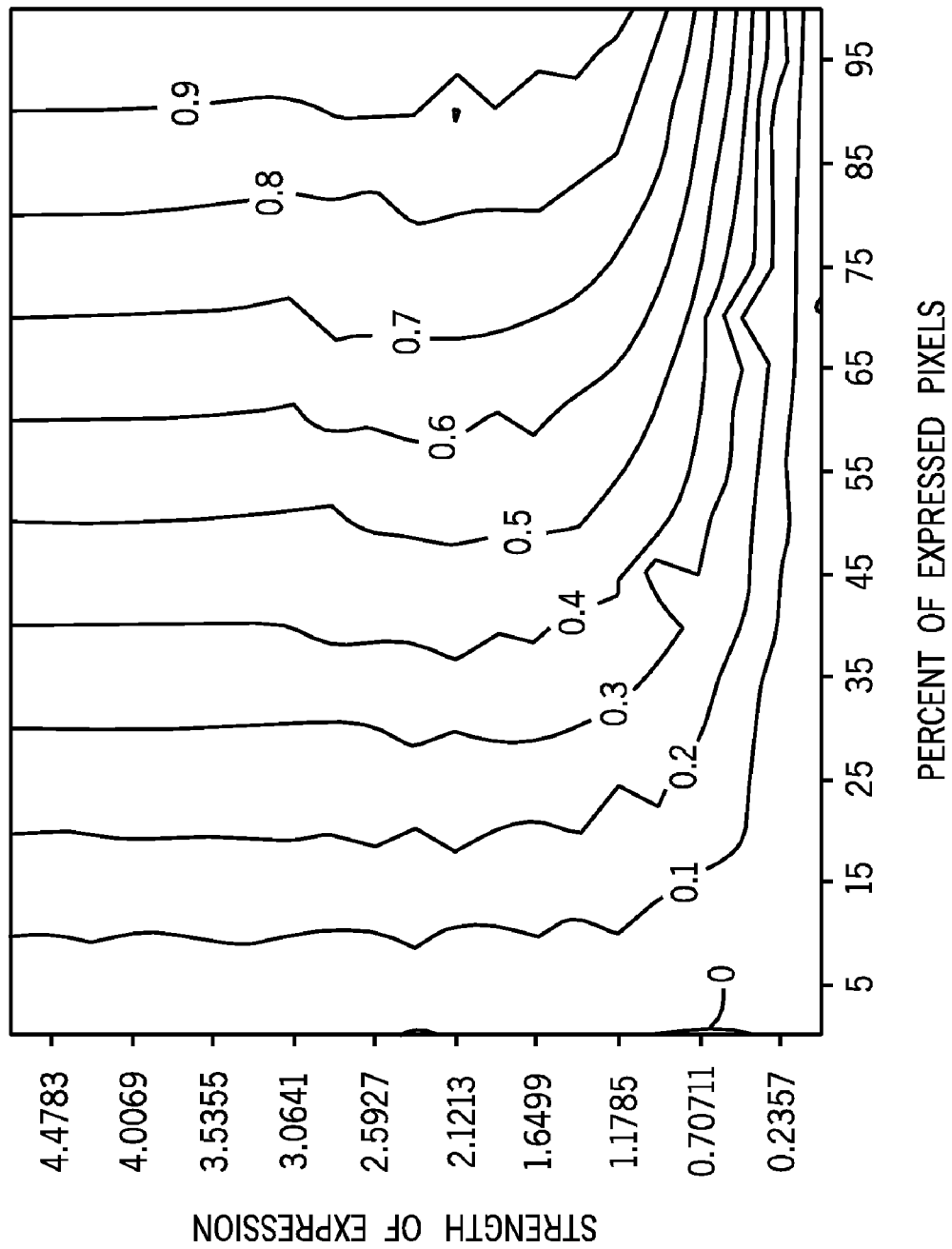
FIG. 7B is a graph of the percent of estimated expression levels between a target distribution and an input distribution estimated by a constrained minimization solution.
Figure 7C:
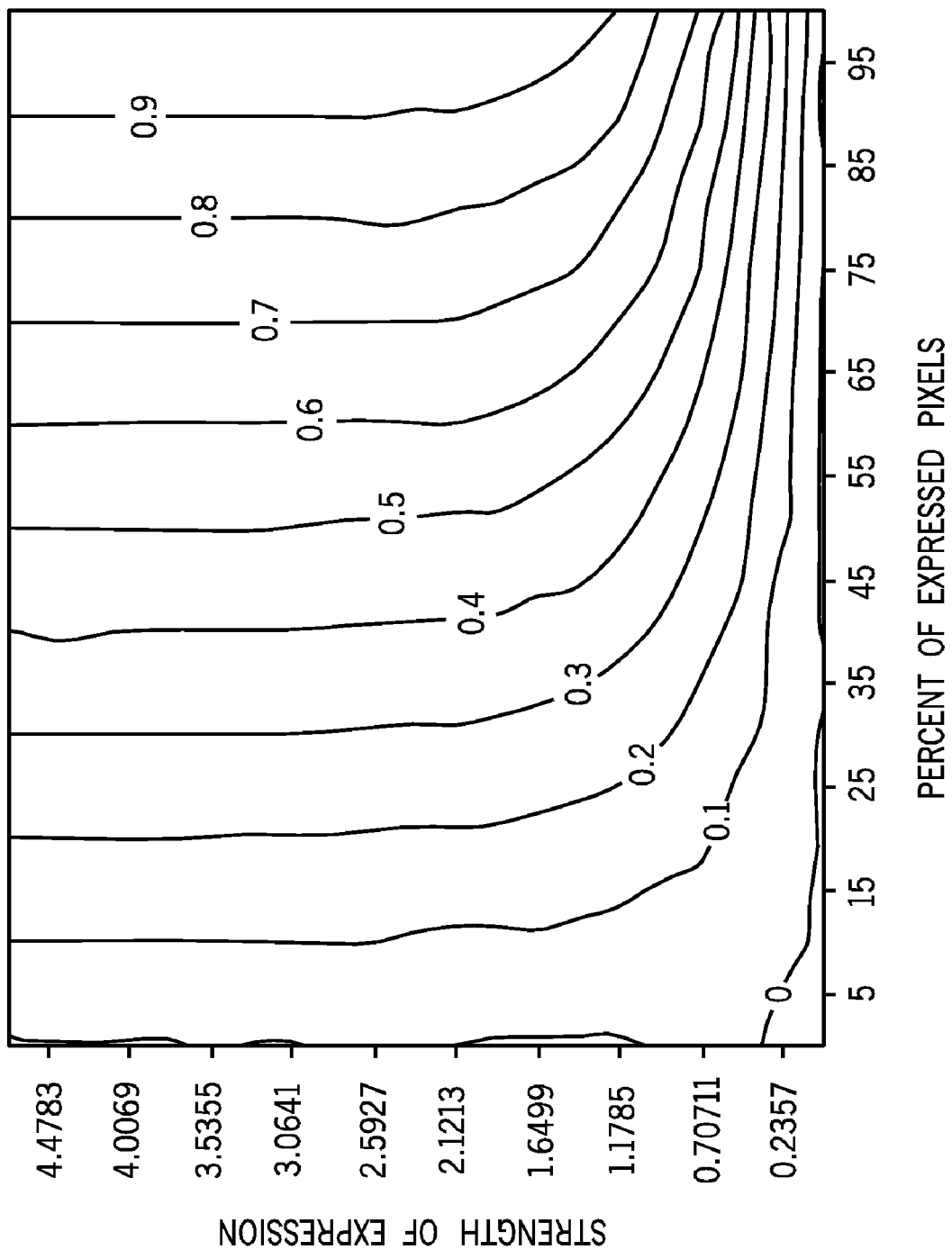
FIG. 7C is a graph of the percent of estimated expression levels between a target distribution and an input distribution estimated by a projection method with uni-modal constraints.
Figure 7D:
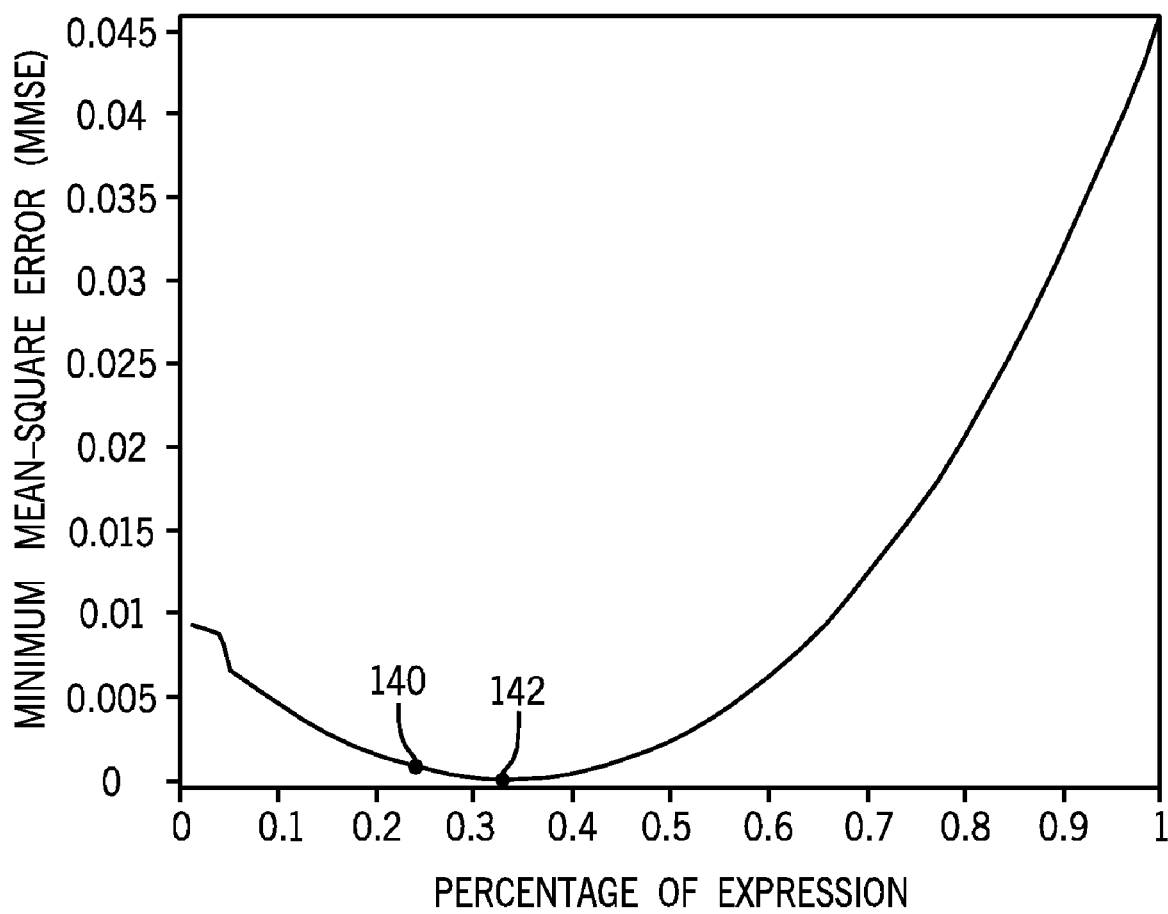
FIG. 7D is a graph of the convex error function near the optimal percent of expression level.

The percent of expression levels between a target distribution and an input distribution estimated from a simulated mixed distribution and a simulated input distribution is shown in FIGS. 7A-7C with the x-axis showing the percent of mixing, and the y-axis showing the theoretical NMD values. The numbers on the contours indicate the percent of mixing estimated by different techniques. Since most expression level cutoff thresholds are set between 0-30%, it is more important for the algorithms to have accurate values for low expression percentages. While all the methods perform well for NMD values greater than 1.1785 ($\mu_2 > \mu_1 + 1.66\sigma$), projection and constraint minimization methods performed better than sKS. For low expression levels, the convex error function near the optimal percent of expression level is shown in FIG. 7D. First the mixed and the input distribution are generated based on a 33% mixing. Then for all possible mixing values the corresponding target distribution is estimated using the constraint minimization method. The left dot on the plot shows the sKS value, and the right dot shows the mixing percentage estimated using the CM method initialized with the sKS values. The value of the above cost function as a function of a set of predefined mixing percentages (100p) is plotted in FIG. 7D for a simulated case. The black dot indicated by reference 140 shows the sKS distance and the associated cost value. The black dot indicated by reference 142 shows the estimated p value by the constraint optimization method. The cost function is plotted for all values of the p value to show the convexity of the problem. For each fixed p value, the target expression is re-estimated.

Because the sKS distance is a simpler statistic than the others and may possibly be more robust to real data, it may be advantageous in certain embodiments to use this metric to identify which compartment is expressed. Among multiple pairs of tissue samples, the decision is also based on percentage of the segmented regions that exist in the image. For example, if the cytoplasm detection does not identify enough cytoplasmic pixels, the cytoplasm related metrics may be excluded. The sign of the sKS distance determines which region is expressed.

FIGS. 8A-D show results from a study in which 123 tissue micro array images from 55 patients (some patients are represented as multiple tissue cores) were stained with DAPI (nuclei), pan-cadherin (membrane), keratin (tumor/epithelial Mask), and estrogen receptor markers. DAPI and pan-cadherin were used to segment the subcellular compartments, and keratin to segment the epithelial mask. Then the distribution of the estrogen receptor protein was calculated on each of the epithelial subcellular regions. Estrogen receptor protein was expected to partially or fully express in the nuclear region for estrogen receptor positive patients. Therefore, the nuclear estrogen receptor distribution was defined as the output distribution comprising mixture of partial expression, non-specific expression and autofluorescence. Membrane estrogen receptor distribution is defined as the input distribution comprising non-specific binding and autofluorescence. The sKS distances for all the images were automatically calculated according to the present techniques and compared to observers' assessments. In the observers' assessment, 19 observers (non-pathologists) were asked to score the collected data set of images as estrogen receptor positive if they visually identified that more than 10% of the nuclei with estrogen receptor expression. Then the majority of the votes determined the most likely score for each image. In addition to the majority score, the percent of observers voting positive was recorded.

FIG. 8A shows the correlation between the sKS score and the percent of observers who scored positive. The lower left quadrant and the upper right quadrant indicate the false positives and false negatives, respectively. The observer cutoff was set to 50% to determine the ER positive with the majority rule, while the sKS cutoff is set to −3%. The negative sign represents that this is nuclear expression relative to the membrane. The estimated expressed percentages represent the percent of nuclear area expressed rather than the percentage of number of nuclei. Note that the automated score was very well correlated with the manual score, yielding only 8 false positives, and 2 false negatives compared to the observer majority. FIG. 8B shows the ROC curve of the sKS score when the majority of the human observers is considered as the ground truth. At −3% cutoff, 96% sensitivity and 90% specificity can be achieved.

Out of the total 55 patients, most patients had more than one needle core (up to three) from their tumors. FIG. 8C shows the comparison of sKS score and percent of positive voters across pairs of tissue samples from the same patients. Notice the few tissue score contradictions when the sKS cutoff is set to −3%, or the majority rule is set to 50%. In this example, the sKS score has less variation compared to human observers. FIG. 8D shows the distribution of percent of expression and strength of expression for estrogen receptor negative (solid dots) and estrogen receptor positive (open dots) tissues identified by the majority of the observers. The clusters in FIG. 8D show how observers react to signal strength and percent of expressed nuclei.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
processing using a processor-based system a first image of a biological sample, wherein the first image is segmented into a first type of compartment and at least a second type of compartment;
processing using a processor-based system a second image of the biological sample, wherein the biological sample comprises a signal generator with binding specificity to a target molecule;
calculating using the processor-based system a percentage of the first type of compartment, the second type of compartment, or a combination thereof, in which the target molecule is expressed; and
calculating using the processor-based system an intensity distribution of the target molecule in the first type of compartment, the second type of compartment, or a combination thereof.

2. The method of claim 1, wherein the first type of compartment comprises a nuclear compartment and the second type of compartment comprises a membrane compartment.

3. The method of claim 2, wherein a third type of compartment comprises a cytoplasmic compartment.

4. The method of claim 1, wherein the first type of compartment comprises a cellular compartment and the second type of compartment comprises an extracellular compartment.

5. The method of claim 1, wherein segmenting comprises segmenting the pixels into a first cellular compartment of a first cell type and a second cellular compartment of a second cell type.

6. The method of claim 1, comprising providing a clinical assessment of the image based on the percentage of target molecule expressed in at least one of the compartment types and the intensity distribution of the target molecule in at least one of the compartment types.

7. The method of claim 1, comprising providing a combined score for the biological sample based on the percentage of target molecule expressed in at least one of the compartment types and the intensity distribution of the target molecule in at least one of the compartment types.

8. The method of claim 1, wherein the first image is segmented based on compartment geometry.

9. The method of claim 1, wherein a strength of expression score for the biological sample is determined based on the intensity distribution of the target molecule in at least one of the compartment types comprises using a mixing equation.

10. The method of claim 1, wherein determining the percentage of target molecule expressed in at least one of the compartment types and the intensity distribution of the target molecule in at least one of the compartment types comprises using a mixing equation.

11. The method of claim 1, wherein determining the expression output comprises using one or more of an equal variance solution, a signed Kolomogorov-Smirnov distance, a constrained minimization solution, or a projection solution with uni-modal constraints.

12. The method of claim 11, wherein determining the expression output does not involve thresholds set by an operator.

13. A non-transitory computer-readable medium comprising instructions for:
   receiving a first image of a biological sample, wherein the image is segmented into a first type of compartment and at least a second type of compartment;
   receiving a second image of the biological sample, wherein the biological sample comprises a signal generator with binding specificity to a target molecule;
   determining a percentage of the first type of compartment, the second type of compartment, or a combination thereof, in which the target molecule is expressed; and
   determining an intensity distribution of the target molecule in the first type of compartment, the second type of compartment, or a combination thereof.

14. The non-transitory computer-readable medium of claim 13, comprising instructions for determining a combined score for the biological sample based on the percentage of target molecule expressed in at least one of the compartment types and the intensity distribution of the target molecule in at least one of the compartment types.

15. The non-transitory computer-readable medium of claim 13, comprising instructions for determining a strength of expression score for the biological sample based on the intensity distribution of the target molecule in at least one of the compartment types comprises using a mixing equation.

16. The non-transitory computer-readable medium of claim 13, wherein the instructions for determining the percentage of target molecule expressed in at least one of the compartment types and the intensity distribution of the target molecule in at least one of the compartment types comprise a mixing equation.

17. The non-transitory computer-readable medium of claim 13, wherein the instructions for determining the expression output comprise one or more of an equal variance solution, a signed Kolomogorov-Smirnov distance, a constrained minimization solution, or a projection solution with uni-modal constraints.

18. The non-transitory computer-readable medium of claim 17, wherein the instructions for determining the expression output do not involve thresholds set by an operator.

19. An image analysis system:
   a processor adapted to receive a first image of a biological sample, wherein the image is segmented into a first type of compartment and at least a second type of compartment and a second image of the biological sample, wherein the biological sample comprises a signal generator with binding specificity to a target molecule;
   the processor adapted to run instructions for:
      determining a percentage of the first type of compartment, the second type of compartment, or a combination thereof, in which the target molecule is expressed; and
      determining an intensity distribution of the target molecule in the first type of compartment, the second type of compartment, or a combination thereof.

20. The image analysis system of claim 19, wherein the processor comprises instructions for determining a combined score for the biological sample based on the percentage of target molecule expressed in at least one of the compartment types and the intensity distribution of the target molecule in at least one of the compartment types.

21. The image analysis system of claim 19, wherein the processor comprises instructions for determining a strength of expression score for the biological sample based on the intensity distribution of the target molecule in at least one of the compartment types comprises using a mixing equation.

22. The image analysis system of claim 19, wherein the instructions for determining the percentage of target molecule expressed in at least one of the compartment types and the intensity distribution of the target molecule in at least one of the compartment types comprise a mixing equation.

23. The image analysis system of claim 19, wherein the instructions for determining the expression output comprise one or more of an equal variance solution, a signed Kolomogorov-Smirnov distance, a constrained minimization solution, or a projection solution with uni-modal constraints.

24. The image analysis system of claim 19, wherein the instructions for determining the expression output do not involve thresholds set by an operator.

* * * * *